United States Patent
Kim et al.

(10) Patent No.: US 10,425,209 B2
(45) Date of Patent: *Sep. 24, 2019

(54) METHOD AND APPARATUS FOR PROCESSING ACK SIGNAL IN A WIRELESS LOCAL AREA NETWORK SYSTEM

(71) Applicant: LG ELECTRONICS INC., Seoul (KR)

(72) Inventors: Suhwook Kim, Seoul (KR); Kiseon Ryu, Seoul (KR); Jeongki Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,249

(22) Filed: Jul. 18, 2018

(65) Prior Publication Data
US 2018/0351725 A1 Dec. 6, 2018

Related U.S. Application Data

(63) Continuation of application No. 15/246,104, filed on Aug. 24, 2016, now Pat. No. 10,063,359.

(60) Provisional application No. 62/209,325, filed on Aug. 24, 2015, provisional application No. 62/237,584, filed on Oct. 6, 2015.

(51) Int. Cl.
*H04L 5/00* (2006.01)
*H04L 1/16* (2006.01)
*H04L 1/00* (2006.01)
*H04W 84/12* (2009.01)

(52) U.S. Cl.
CPC .......... *H04L 5/0055* (2013.01); *H04L 1/0031* (2013.01); *H04L 1/1621* (2013.01); *H04L 1/1685* (2013.01); *H04L 1/1614* (2013.01); *H04W 84/12* (2013.01)

(58) Field of Classification Search
CPC . H04W 72/0406; H04W 74/04; H04W 84/12; H04W 72/0453; H04L 5/00; H04L 1/16; H04L 1/00
See application file for complete search history.

(56) References Cited

U.S. PATENT DOCUMENTS

| | | |
|---|---|---|
| 2013/0250904 A1 | 9/2013 | Kang et al. |
| 2015/0124690 A1 | 5/2015 | Merlin et al. |
| 2016/0080115 A1 | 3/2016 | Josiam et al. |
| 2016/0087775 A1 | 3/2016 | Hedayat |
| 2016/0095139 A1 | 3/2016 | Ding et al. |

(Continued)

OTHER PUBLICATIONS

U.S. Appl. No. 15/246,104, Office Action dated Nov. 24, 2017, 5 pages.

*Primary Examiner* — Chi Ho A Lee
(74) *Attorney, Agent, or Firm* — Lee Hong Degerman Kang & Waimey

(57) ABSTRACT

An ACK signal processing method that can be used in a wireless LAN system is proposed. Various information that can be used for a downlink MU PPDU for multiple receiving stations may be proposed, and, for example, in order to omit the re-transmission of the related art, information requesting an ACK or Block ACK corresponding to previously transmitted data may be included. If an immediate acknowledgement (ACK) frame fails to be received after the MU-PPDU is transmitted from the AP, a Block ACK may be requested. In this case, while a Block ACK is requested, a radio resource through which a Block ACK is delivered may be allocated.

10 Claims, 42 Drawing Sheets

(56) References Cited

U.S. PATENT DOCUMENTS

| | | |
|---|---|---|
| 2016/0285608 A1 | 9/2016 | Kwon et al. |
| 2016/0330007 A1 | 11/2016 | Cherian et al. |
| 2016/0360509 A1 | 12/2016 | Seok |
| 2016/0374081 A1 | 12/2016 | Asterjadhi et al. |
| 2017/0005709 A1 | 1/2017 | Li et al. |
| 2017/0006608 A1 | 1/2017 | Josiam et al. |
| 2017/0063509 A1 | 3/2017 | Kim et al. |
| 2017/0331736 A1 | 11/2017 | Seok |

FIG. 2

| L-LTF | L-STF | L-SIG | Data |

PPDU Format (IEEE 802.11a/g)

| L-LTF | L-STF | L-SIG | SIG A | HT-SFT | HT-LFT | ... | HT-LFT | Data |

HT PPDU Format (IEEE 802.11n)

| L-LTF | L-STF | L-SIG | VHT-SIG A | VHT-SFT | VHT-LFT | VHT-SIG B | Data |

VHT PPDU Format (IEEE 802.11ac)

(a) Sender (b) Receiver (a)

(b)

METHOD AND APPARATUS FOR PROCESSING ACK SIGNAL IN A WIRELESS LOCAL AREA NETWORK SYSTEM

CROSS-REFERENCE TO RELATED APPLICATION

This application is a continuation of U.S. patent application Ser. No. 15/246,104, filed on Aug. 24, 2016, now U.S. Pat. No. 10,063,359, which claims the benefit of U.S. Provisional Patent Application Nos. 62/209,325, filed on Aug. 24, 2015, and 62/237,584, filed on Oct. 6, 2015, the contents of which are all hereby incorporated reference herein in their entirety.

BACKGROUND

Technical Field

This specification relates to a method and apparatus for processing an ACK signal in a wireless LAN system and, more particularly, to a method and apparatus for processing an ACK signal corresponding to a PPDU for multi-users in a wireless LAN system.

Description of the Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

This specification proposes a method and apparatus for processing an ACK signal in a wireless LAN system.

This specification proposes a method and apparatus for processing an ACK signal in a next generation wireless LAN system configuring a multi-user PPDU through multiple RUs.

Technical Solutions

An example of this specification proposes a transmitting method that is applicable to a wireless LAN system.

More specifically, the example of this specification proposes a method for processing a signal that is performed by an AP of the wireless LAN system supporting multiple RUs for a data field.

More specifically, the AP may transmit a downlink MU PPDU for multiple receiving stations.

Additionally, after the MU PPDU is transmitted, the AP may determine whether or not an immediate acknowledgement (immediate ACK) corresponding to the MU PPDU is received by the AP Furthermore, in case the immediate ACK frame is not received, the AP may transmit a BAR requesting an ACK corresponding to the MU PPDU.

BRIEF DESCRIPTION OF THE DRAWINGS

FIG. 2 is a diagram illustrating an example of a PPDU used in an IEEE standard.

DESCRIPTION OF EXEMPLARY EMBODIMENTS

Figure 1:
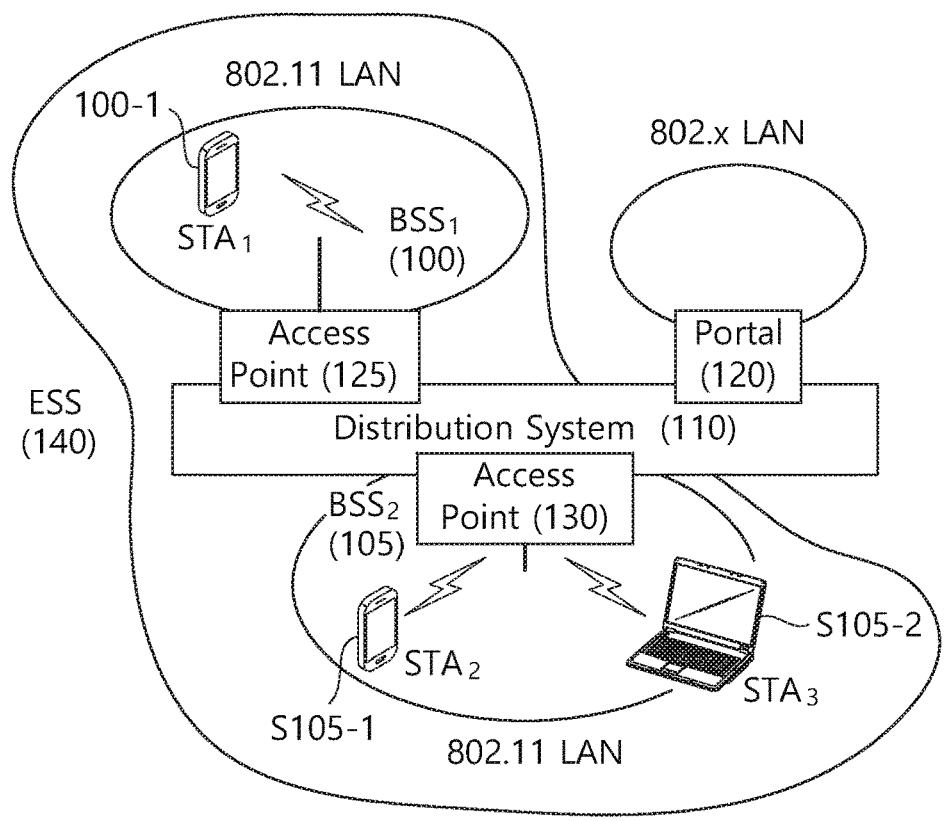
FIG. 1 is a conceptual view illustrating the structure of a wireless local area network (WLAN).
Figure 1:
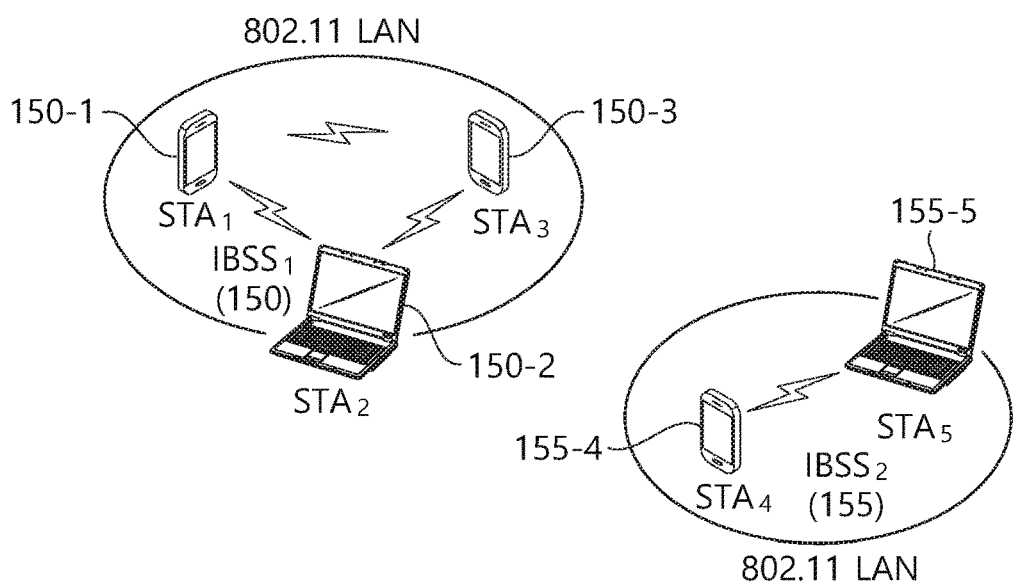

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in diverse meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively.

However, the improved signal proposed in the embodiment is not particularly limited to an HE-SIG-A and/or HE-SIG-B standard and may be applied to control/data fields having various names, which include the control information in a wireless communication system transferring the user data.

Figure 3:
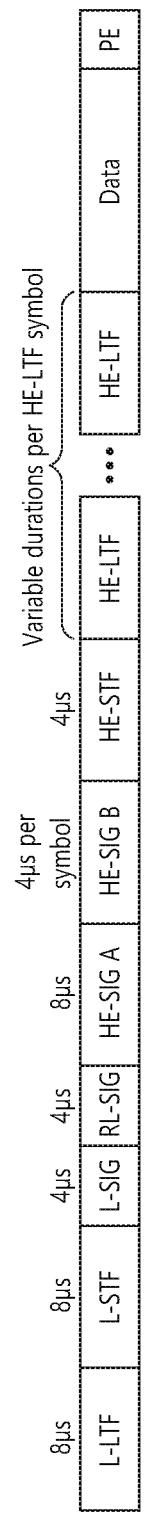
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
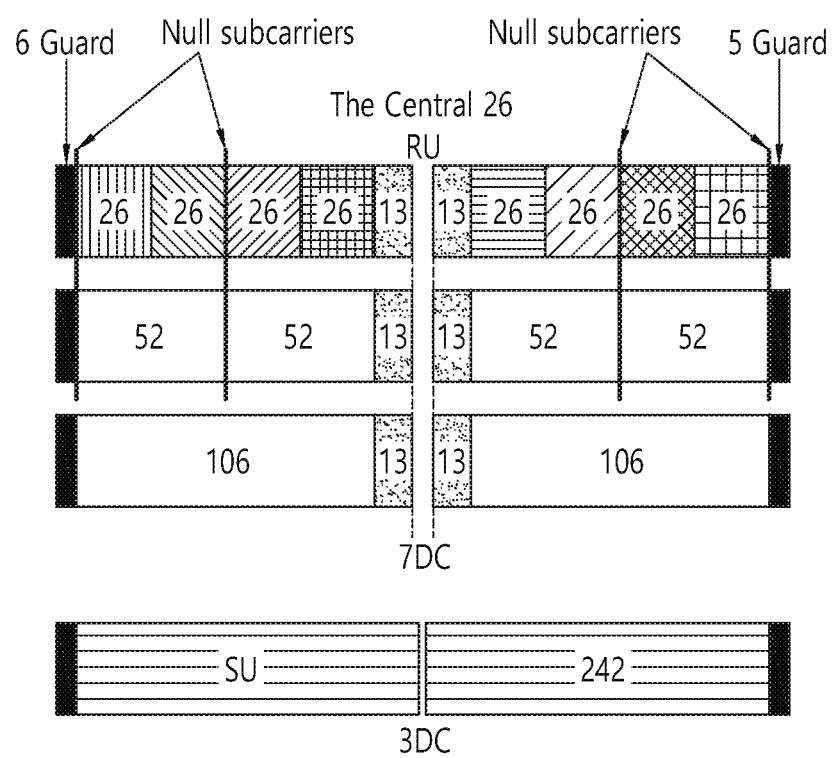
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
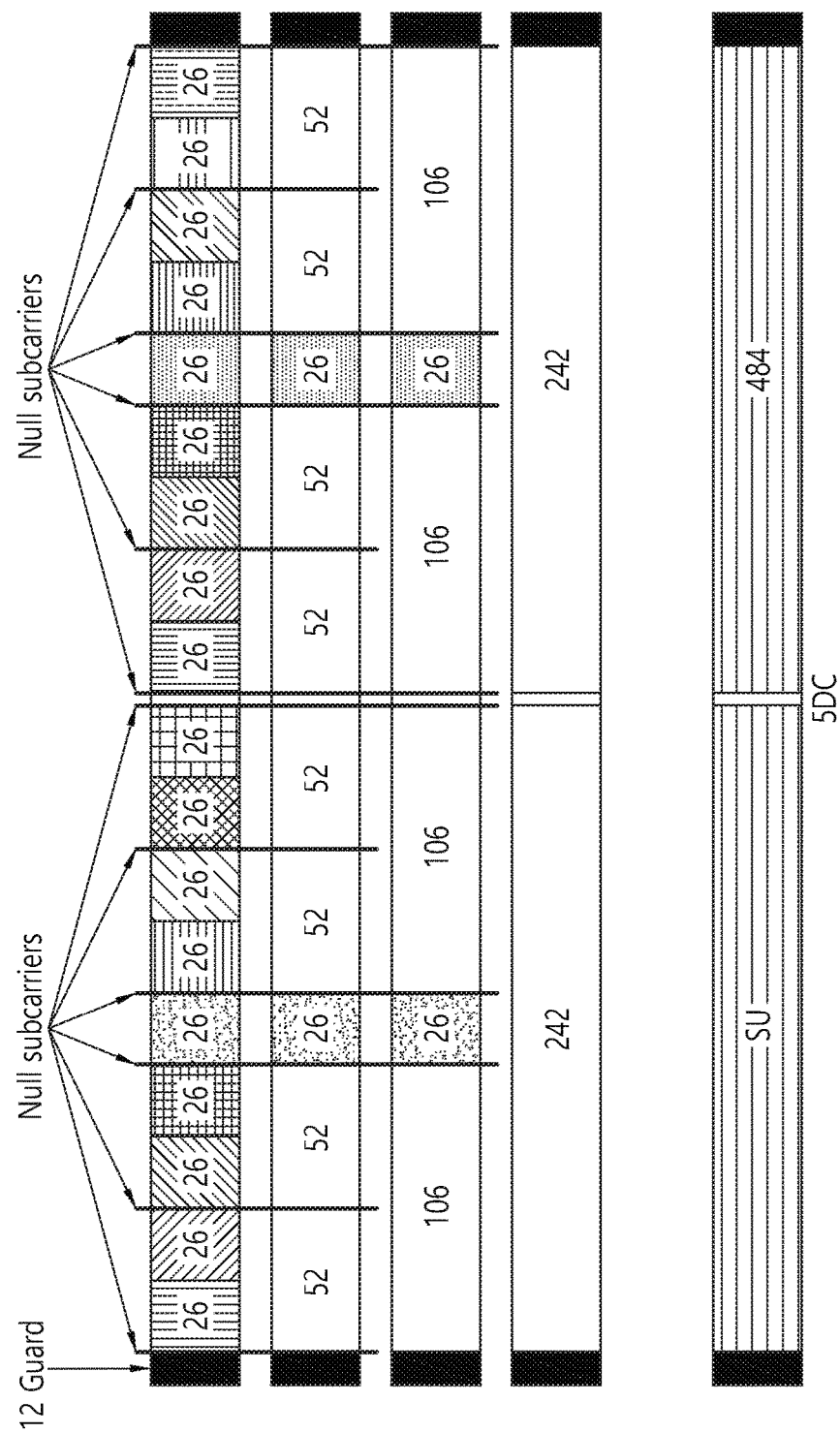
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
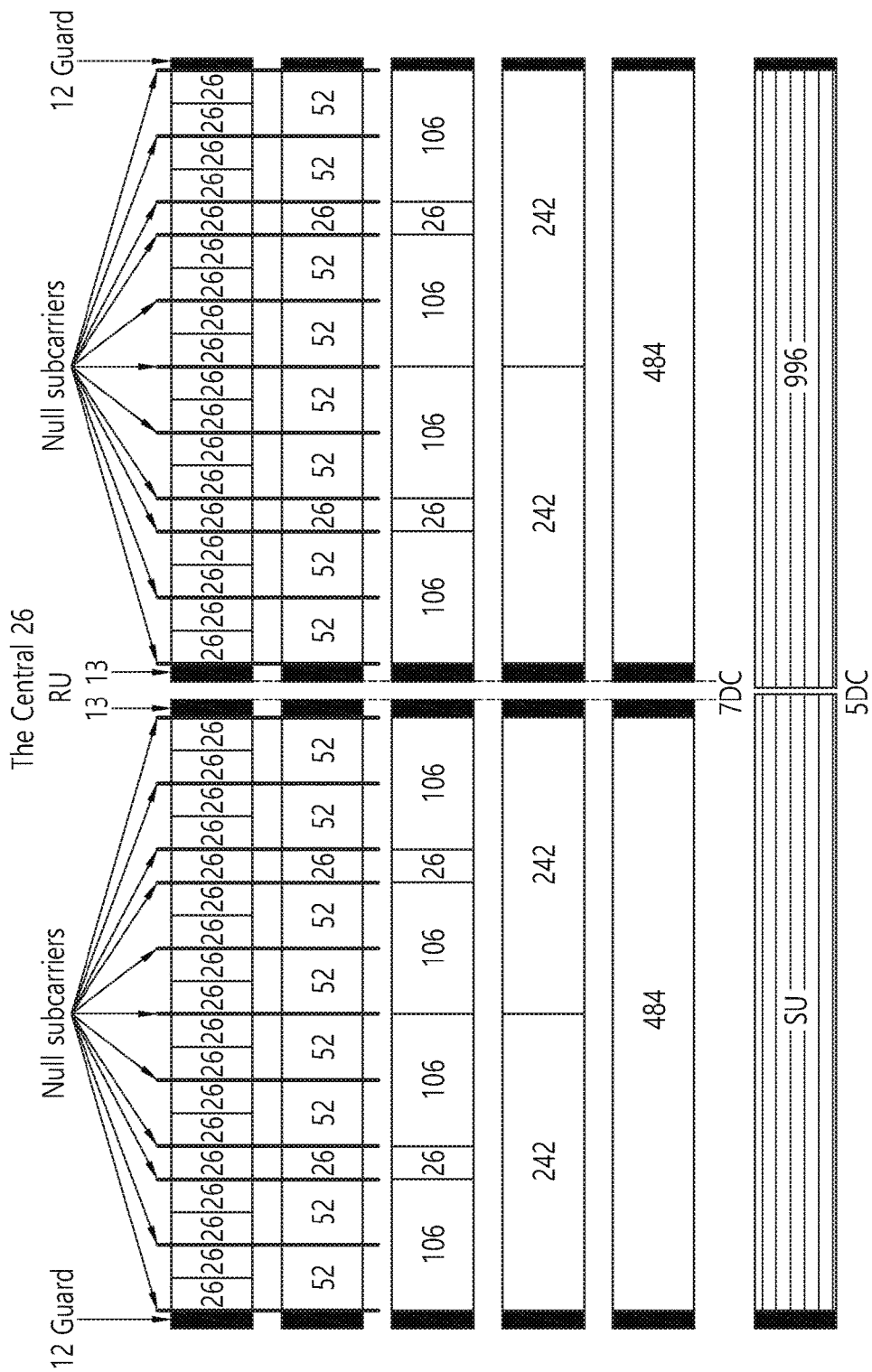
FIG. 6 is a diagram illustrating a layout of resource units (RUs) used in a band of 80 MHz.

FIG. 6 is a diagram illustrating a layout of resource units (RUs) used in a band of 80 MHz.

Figure 26:
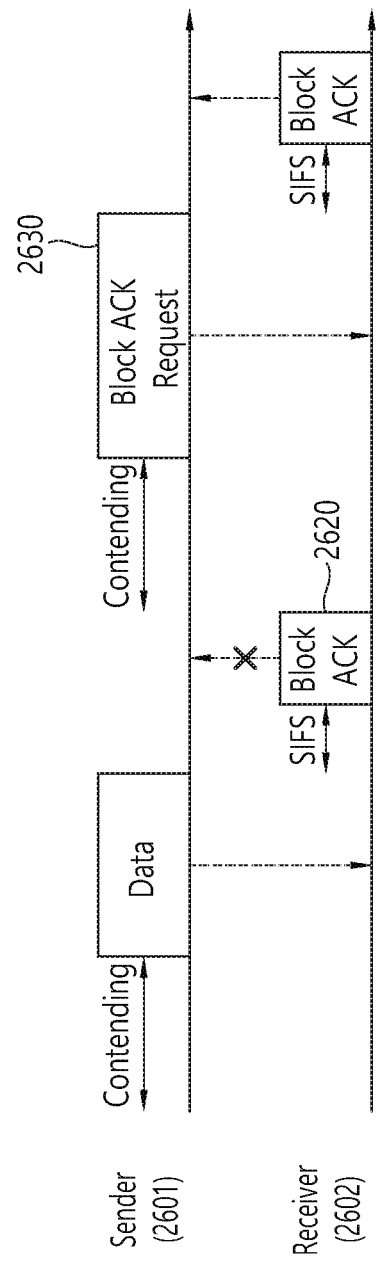
FIG. 26 illustrates an example of a BAR frame being transmitted in case an error occurs with respect to the BA.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
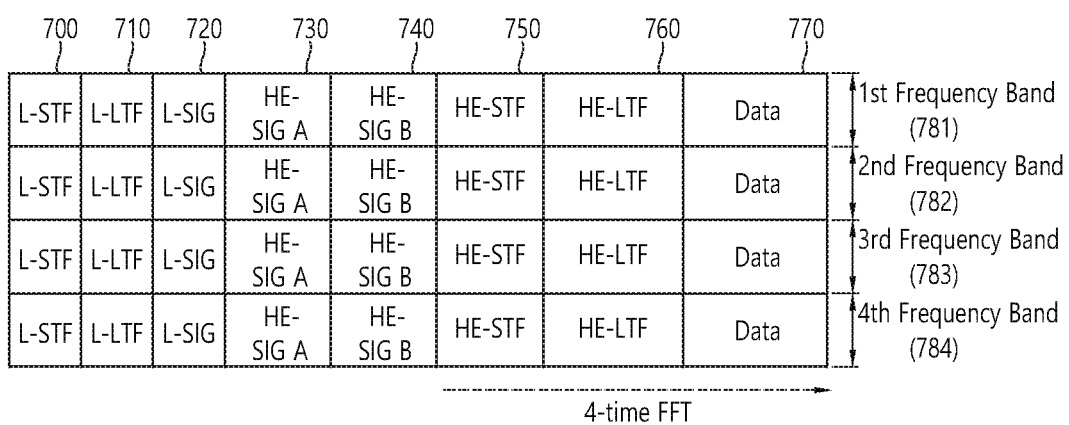
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
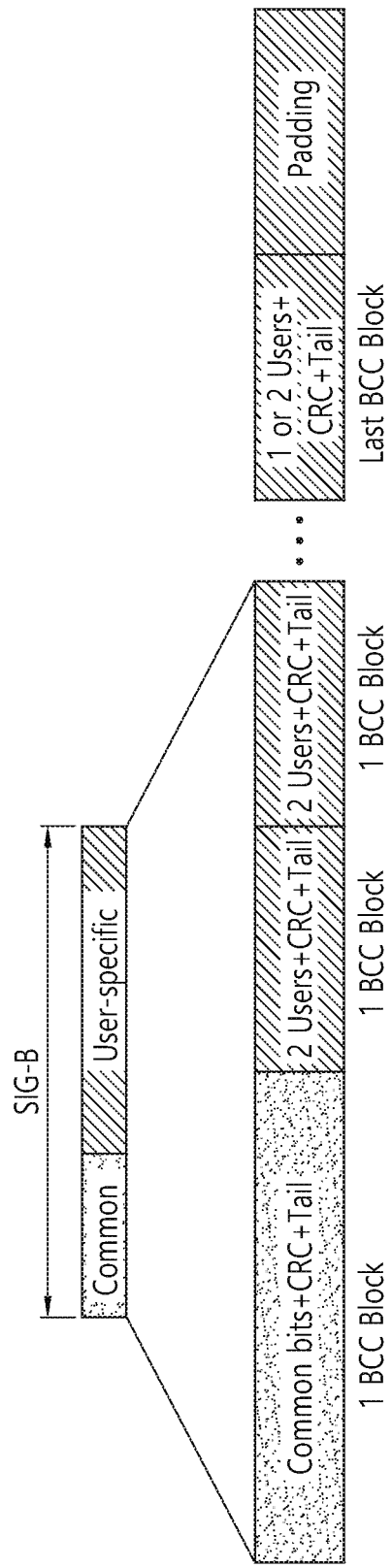
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

The characteristic that the size of the FFT/IFFT being applied to the HE-STF 750 and the fields after the HE-STF 750 can be diversely configured may be applied to a downlink PPDU and/or an uplink PPDU. More specifically, such characteristic may be applied to the PPDU shown in FIG. 7 or to an uplink MU PPDU, which will be described later on.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources corresponding to each of the multiple STAs as uplink transmission resources based on OFDMA. Additionally, as described above, the frequency resources each being different from one another may correspond to different subbands (or sub-channels) or different resource units (RUs).

The different frequency resources corresponding to each of the multiple STAs are indicated through a trigger frame.

Figure 9:
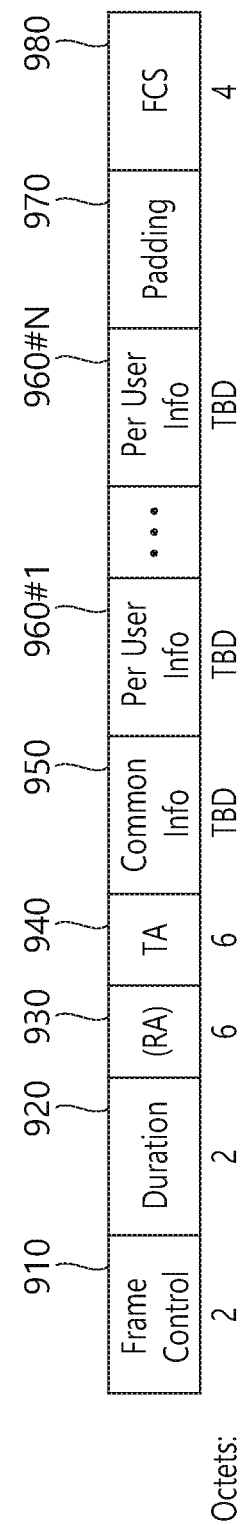
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

Additionally, a RA field 930 may include address information of a receiving STA of the corresponding trigger frame, and this field may also be omitted as required. A TA field 940 may include address information of the STA (e.g., AP) transmitting the corresponding trigger frame, and a common information field 950 may include common control information that is applied to the receiving STA receiving the corresponding trigger frame.

Figure 10:
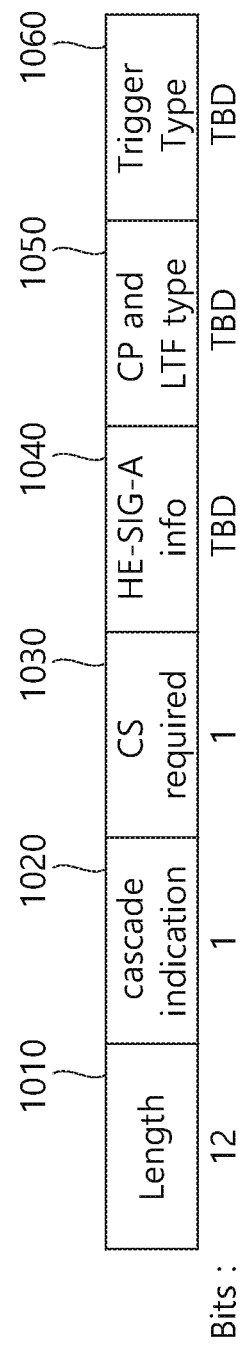
FIG. 10 illustrates an example of a common information field.

FIG. 10 illustrates an example of a common information field. Among the sub-fields of FIG. 10, some may be omitted, and other additional sub-fields may also be added. Additionally, the length of each of the sub-fields shown in the drawing may be varied.

As shown in the drawing, the Length field 1010 may be given that same value as the Length field of the L-SIG field of the uplink PPDU, which is transmitted with respect to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted with respect to the corresponding trigger frame.

A CP and LTF type field 1050 may include information on a LTF length and a CP length of the uplink PPDU being transmitted with respect to the corresponding trigger frame. A trigger type field 1060 may indicate a purpose for which the corresponding trigger frame is being used, e.g., general triggering, triggering for beamforming, and so on, a request for a Block ACK/NACK, and so on.

Meanwhile, the remaining description on FIG. 9 will be additionally provided as described below.

It is preferable that the trigger frame includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 11:
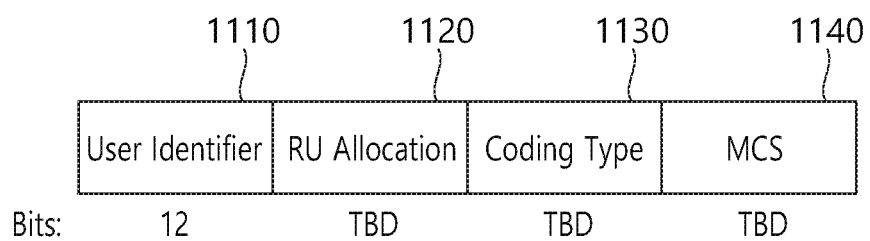
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

Additionally, a RU Allocation field 1120 may be included in the sub-field of the per user information field. More specifically, in case a receiving STA, which is identified by the User Identifier field 1110, transmits an uplink PPDU with respect to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted with respect to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted with respect to the trigger frame of FIG. 9.

Figure 12:
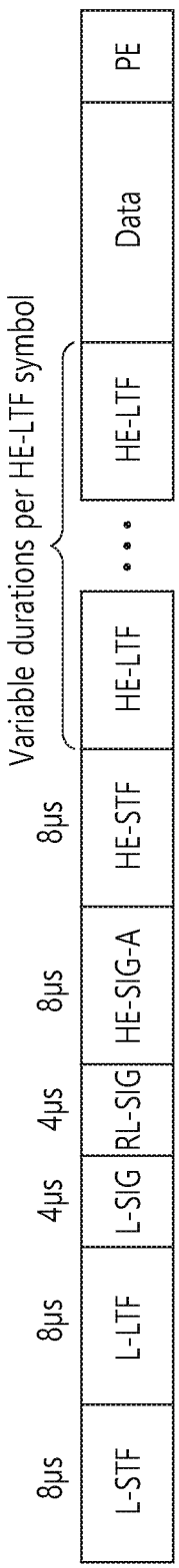
FIG. 12 is a block diagram illustrating an example of an uplink MU PPDU.

FIG. 12 is a block diagram illustrating an example of an uplink MU PPDU. The uplink MU PPDU of FIG. 12 may be transmitted with respect to the above-described trigger frame. As shown in the drawing, the PPDU of FIG. 12 includes diverse fields, and the fields included herein respectively correspond to the fields shown in FIG. 2, FIG. 3, and FIG. 7. Meanwhile, as shown in the drawing, the uplink PPDU of FIG. 12 may not include a HE-SIG-B field and may only include a HE-SIG-A field.

The method proposed in this specification may be used for transmitting diverse types of SDUs/PDUs. Additionally, the method proposed in this specification may also be related to diverse types of ACK/NACK operations. Hereinafter, diverse types of SDUs/PDUs that may be included in the above-described data field and ACK/NACK operations that may be applied to an example of this specification will be described in detail.

Figure 13:
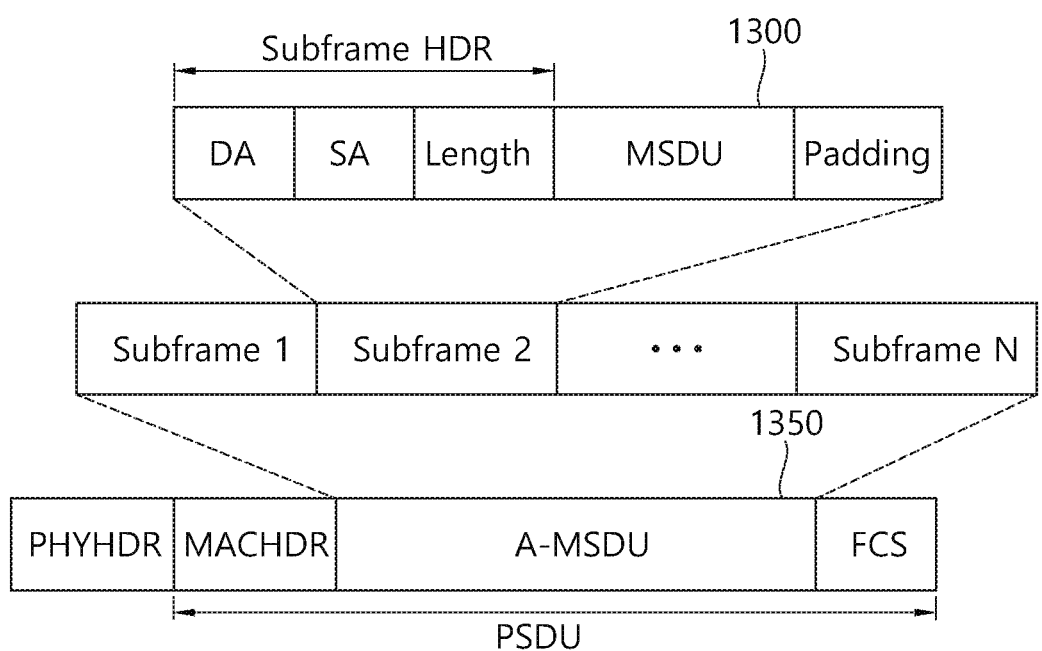
FIG. 13 is a conceptual diagram illustrating an A-MSDU.

FIG. 13 is a conceptual diagram illustrating an A-MSDU.

In the IEEE 802.11n, a method for performing aggregation on a data frame in order to reduce MAC error overhead has been defined. More specifically, MAC error overhead may be reduced in the HT-PPDU and PPDUs corresponding to its subsequent versions by performing aggregation.

A MAC service data unit (MSDU) 1300, which is generated in an application layer for the aggregation of the data frame, may be processed with aggregation (i.e., aggregated) in a higher layer of the MAC layer so as to be generated as a single MSDU. The MSDU that is aggregated in the higher layer of the MAC layer may be defined by using the term aggregate-MSDU (A-MSDU) 1350. The A-MSDU 1350 may be generated based on an aggregation of multiple MSDUs 1300 each having the same priority level and each having the same receiver address (RA).

Each MSDU 1300 may include a subframe header (subframe HDR), which is configured of a destination address (DA), a source address (SA), and a MSDU length. In order to create an A-MSDU subframe to have a total length that is equal to the multiple of a predetermined number (e.g., a multiple of 4 octets), padding may be performed on the A-MSDU subframe. Multiple A-MSDU subframes may be grouped to form a single A-MSDU 1350.

Unlike the single MSDU, fragmentation is not performed on the A-MSDU 1350, and, instead, the A-MSDU 1350 may be transmitted by being formed as a single QoS data MAC protocol data unit (MPDU). The A-MSDU 1350 shown in the drawing may be delivered only to STAs supporting aggregation and de-aggregation (e.g., STAs supporting the IEEE 802.11n standard and other standards corresponding to its subsequent versions).

In case the ACK policy of the QoS data MPDU is configured as normal ACK, the A-MSDU 1350 may not be aggregated as an A-MPDU. Additionally, whether or not the A-MSDU 1350 can be aggregated to the A-MPDU may vary depending upon whether or not a block acknowledgement (ACK) agreement has been established (or made) for each traffic identifier (TID). Additionally, even if a block ACK agreement has been established with respect to a TID, in case an A-MSDU block ACK supportability indicator of an add block acknowledgement (ADDBA) response frame of the receiving end corresponding to the add block acknowledgement (ADDBA) request frame indicates that block ACK is not supported, the A-MSDU may not be included in the A-MPDU.

Figure 14:
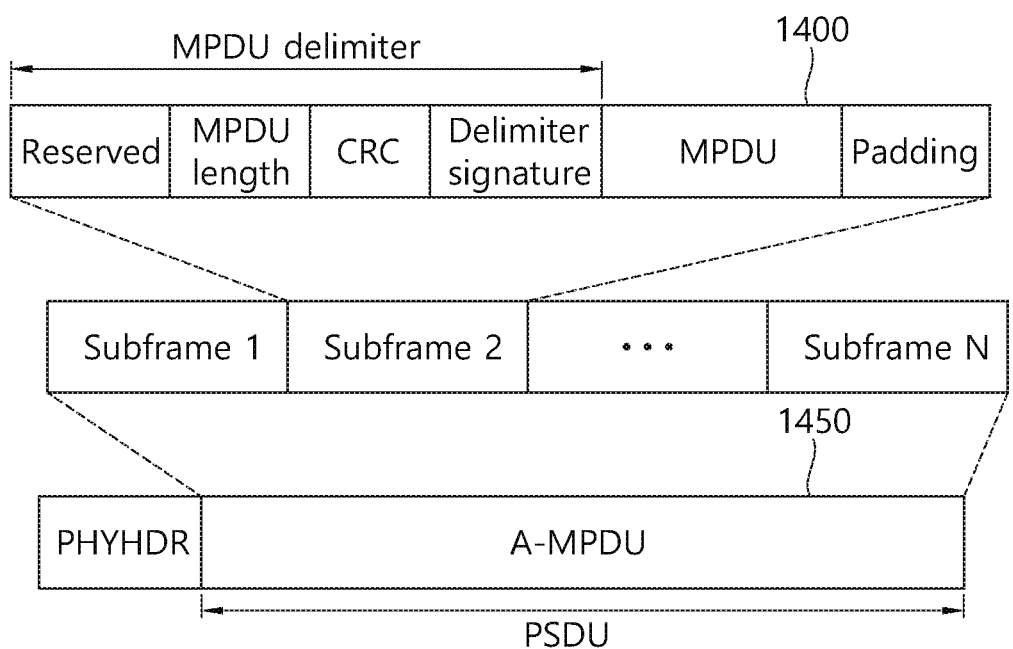
FIG. 14 is a conceptual diagram illustrating an A-MPDU.

FIG. 14 is a conceptual diagram illustrating an A-MPDU.

Referring to FIG. 14, a single A-MPDU 1450 may be configured at a lower portion of the MAC layer by grouping multiple MPDUs 1400 each having the same receiver address (RA), TID, and ACK policy.

The A-MPDU 1450 is configured of one or more A-MPDU subframes, and each A-MPDU subframe may include an MPDU delimeter and an MPDU 1400. An MPDU delimeter may be used in order to determine whether or not an error exists in the A-MPDU subframe(s) configuring the A-MPDU 1450. Multiple A-MPDU subframes may configure a single A-MPDU 1450.

Whether or not the A-MPDU 1450 is successfully received (or whether or not the reception of the A-MPDU 1450 is successful) may be indicated based on the block ACK. More specifically, instead of using the single ACK, which is used in the related art, an A-MPDU unit block ACK may be used for the A-MPDU 1450.

Figure 15:
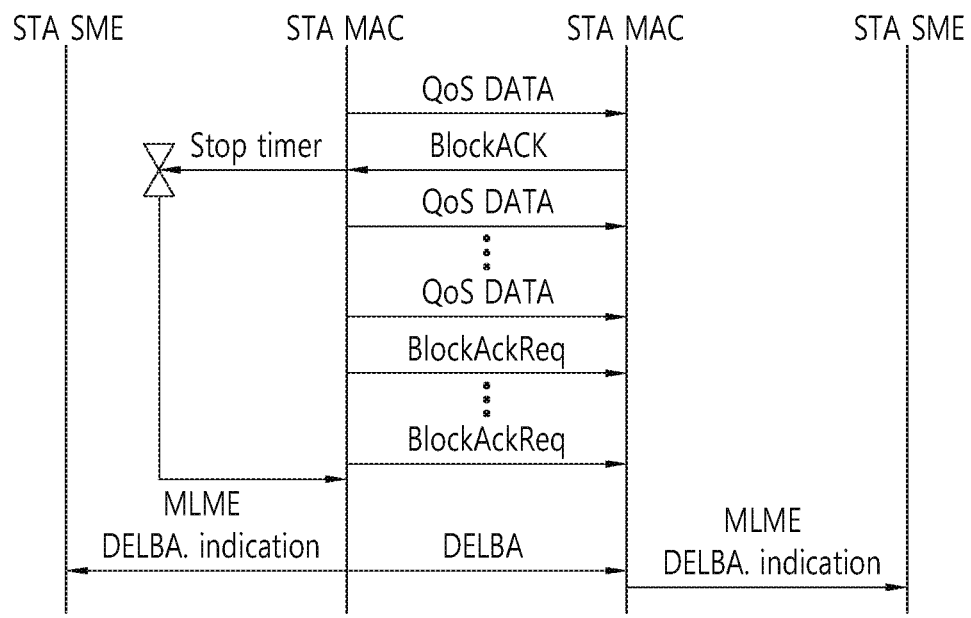
FIG. 15 illustrates a block ACK operation.
Figure 15:
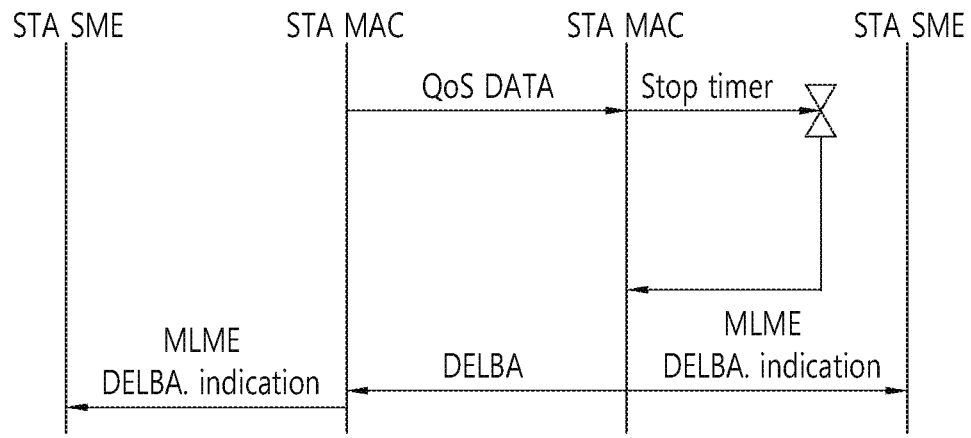

FIG. 15 illustrates a block ACK operation.

The block ACK mechanism has been adopted in order to simultaneously transmit response frames including ACK information corresponding to the multiple frames, which were transmitted during the TXOP period (or duration), in a single transmission. In case the block ACK mechanism is used, just as in the A-MSDU or A-MPDU, the efficiency in the MAC layer may be enhanced due to a decrease in the overhead.

Referring to FIG. 15, the block ACK transmission corresponding to an A-MPDU of one TID may be performed based on a setup procedure, a transmission procedure, and a tear down procedure. The setup procedure may correspond to a procedure requesting for a block ACK session and responding to the request.

During the transmission procedure, the STA of the transmitting end (hereinafter referred to as the transmitting end) may transmit consecutive data to the STA of the receiving end (hereinafter referred to as the receiving end), and the STA of the receiving end may transmit an aggregated response corresponding to the consecutive data to the STA of the transmitting end.

During the tear down procedure, the setup block ACK may be torn down (or cancelled).

More specifically, during the setup procedure, the transmitting end may transmit an add block acknowledgement (ADDBA) request frame to the receiving end, and the receiving end may transmit an ADDBA response frame to the transmitting end. More specifically, the transmitting end may transmit an ADDBA request frame, which corresponds to a management frame, to the receiving end. The ADDBA request frame may request for a block ACK agreement corresponding to the current TID. The ADDBA request frame may transmit information on block ACK policy types, transmission buffer size of the transmitting end, a time out value of a block ACK session, a starting sequence number (SSN), and so on, to the receiving end. After receiving the ADDBA request frame, the receiving end may transmit an ADDBA response frame to the transmitting end as a response to the received ADDBA request frame. The ADDBA response frame may include a block ACK agreement status, an ACK policy, a buffer size, a time out value, and so on.

During the transmission procedure, the transmitting end may transmit an A-MPDU to the receiving end. In case the transmission condition of a block ACK request (BAR) frame corresponding to the A-MPDU is satisfied, the transmitting end may transmit a BAR frame to the receiving end. In case the transmission of the A-MPDU performed by the transmitting end is successful, the receiving end that has received the BAR frame may transmit a block ACK corresponding to the A-MPDU to the transmitting end.

The tear down procedure may be carried out in case set up time values of inactivity timers, which are set up in the transmitting end and the receiving end, are expired, or if there are no more data that are to be transmitted with respect to the corresponding TID. For example, with the expiration of the time out value set up in the inactivity timer for block ACK error recovery, a delete block acknowledgement (DELBA) frame may be transmitted to the receiving end or the transmitting end, and, then, the block ACK session may be ended. In case the transmitting end receives the block ACK, the inactivity timer of the transmitting end may be re-set. In case the receiving end receives the MPDU and the block ACK request frame, the inactivity timer of the receiving end may be re-set.

Figure 16:
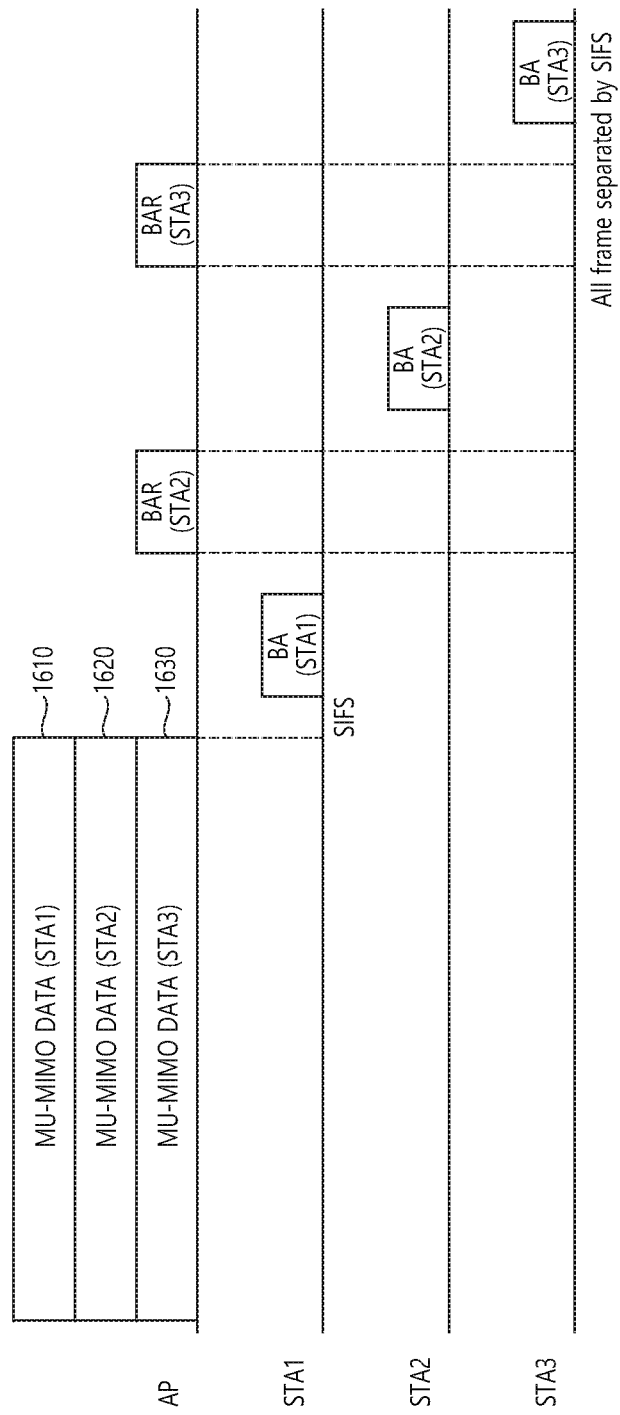
FIG. 16 illustrates an example of an ACK procedure for transmitting a downlink MU PPDU.

FIG. 16 illustrates an example of an ACK procedure for transmitting a downlink MU PPDU.

As shown in the drawing, the example of FIG. 16 is related to a method for transmitting a downlink MU PPDU for multiple receiving stations. As shown in the drawing, the downlink MU PPDU may correspond to signals 1610, 1620, and 1630 that are configured for multiple stations by using the MU-MIMO method. More specifically, the example of FIG. 16 may be related to a MU-MIMO PPDU, wherein the spatial multiplexing method is applied in the same frequency band.

In the example of FIG. 16, as an ACK policy for the first STA (STA 1), an "Implicit Block ACK" may be requested. Additionally, as an ACK policy for STA 2 and STA 3, a "Block ACK(BA)" may be requested. In this case, as shown in the drawings, immediately after the MU-MIMO PPDU 1610, 1620, and 1630 is received (i.e., after SIFS), STA 1 transmits a BA. When the STA 2 and STA 3 receive polling, which is performed by the BAR frame, during the same TXOP, the STA 2 and STA 3 respectively transmit a BA as a response to the received polling.

Figure 17:
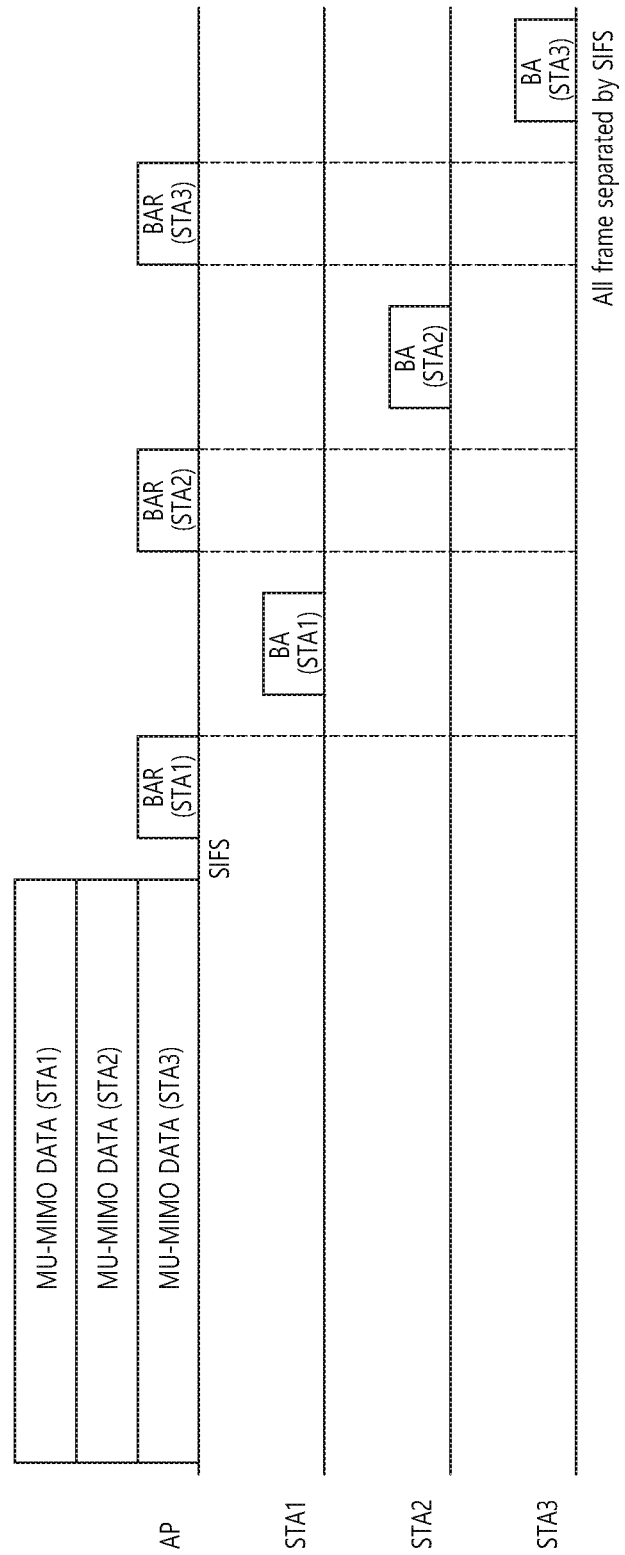
FIG. 17 illustrates an example of an ACK procedure for transmitting a downlink MU PPDU.

FIG. 17 illustrates an example of an ACK procedure for transmitting a downlink MU PPDU.

Just as in the example of FIG. 16, the downlink MU PPDU of FIG. 17 may correspond to a MU-MIMO PPDU, wherein the spatial multiplexing method is applied in the same frequency band. In case the "Block ACK (BA)" is being requested as an ACK policy corresponding to all of the STAs, as shown in the drawing, a BAR frame is requested during the same TXOP, and, then, BAs may be sequentially transmitted with respect to the requested BAR frame.

Hereinafter, the specification proposes multiple examples related to the ACK frame (i.e., ACK signal). Hereinafter, in the ACK frame being proposed in the example, diverse types of data frames may be generated. More specifically, the data frame may be or may not be transmitted in an A-MPDU format, which is described in FIG. 14, and so on. Additionally, a data frame may be transmitted as an A-MPDU, and an ACK signal/frame may be transmitted as a Block ACK (BA).

In the IEEE 802.11 system, a transmission failure of a data frame is recovered through an ACK frame (e.g., Block ACK) and re-transmission. However, when an error occurs in an ACK frame, which is received by a device (or apparatus) that has transmitted data, the corresponding device usually re-transmits the data frame, but such re-transmission may not be necessary. Hereinafter, the example of this specification proposes an efficient protocol that can resolve such problems.

Figure 18:
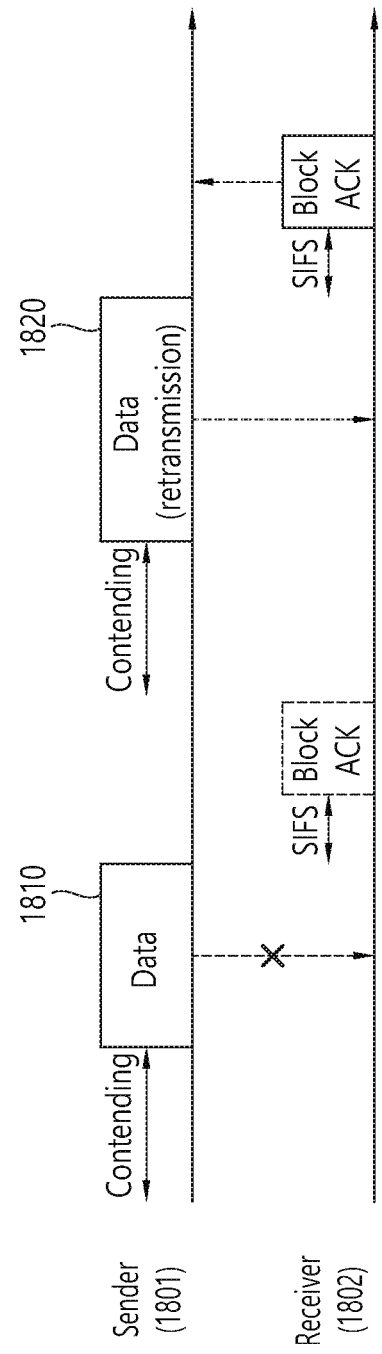
FIG. 18 illustrates a data recovery procedure through an ACK signal corresponding to a data frame.

FIG. 18 illustrates a data recovery procedure through an ACK signal corresponding to a data frame. As shown in the drawing, in case the transmission of the data frame 1810 has failed, the receiving end 1802 does not transmit a Block ACK (BA). Accordingly, the transmitting end 1801 waits for a time period during which the Block ACK (BA) is to be transmitted (e.g., a time period of SIFS) and then re-transmits the data frame 1820.

Figure 19:
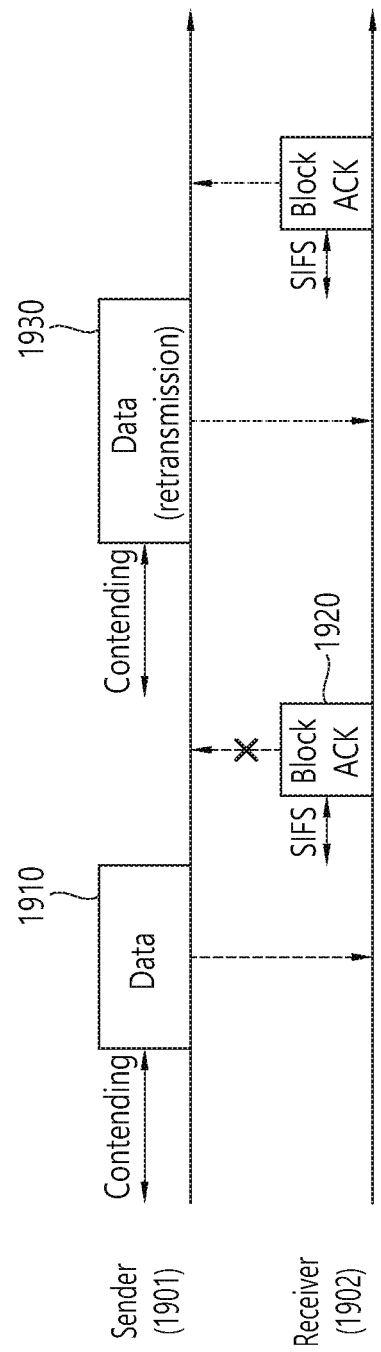
FIG. 19 illustrates another example of a data recovery procedure through an ACK signal corresponding to a data frame.

FIG. 19 illustrates another example of a data recovery procedure through an ACK signal corresponding to a data frame. The example of FIG. 19 relates to a case when a BA 1920 fails to be successfully received by the transmitting end 1901 due to an error. And, at this point, since the transmitting end 1901 has failed to receive the BA 1920, the transmitting end determines that an error has occurred in all of the data frames 1910, which have been transmitted immediately before. Accordingly, the transmitting end 1901 re-transmits the data frame 1920. In this case, a problem may occur in that, even if the initial data frame has been successfully received, re-transmission may occur. In the following example, the problem that may occur in FIG. 19 may be enhanced.

Figure 20:
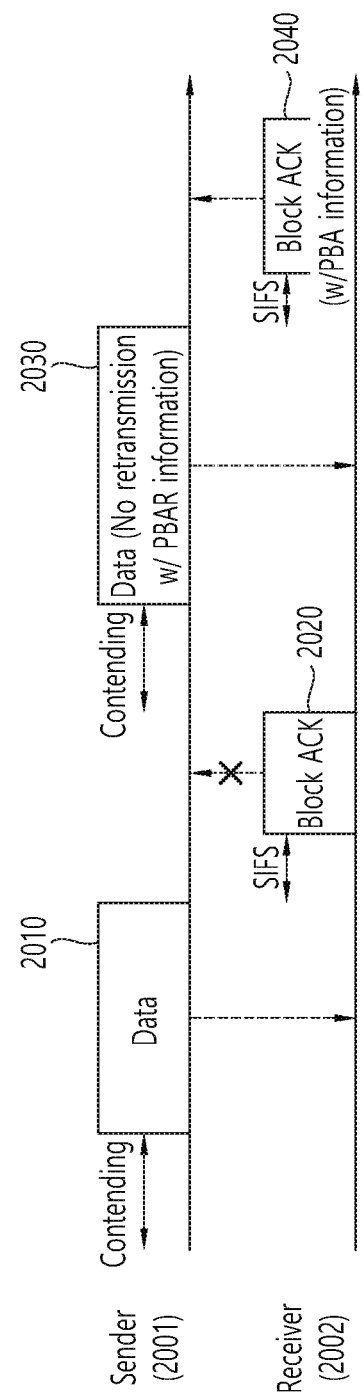
FIG. 20 illustrates an example of a signal processing method according to an example of this specification.

FIG. 20 illustrates an example of a signal processing method according to an example of this specification.

In case the transmitting end 2001 fails to receive the Block ACK 2020, the data frame 2010 is not always re-transmitted. More specifically, the transmitting end 2001 determines whether an error corresponding to the data frame 2010 has occurred or whether an error corresponding to the BA 2020 has occurred. If it is determined that an error corresponding to the BA 2020 has occurred, re-transmission is omitted, and, after preparing a next data frame 2030, a contending procedure is carried out. At this point, it is preferable that the data frame 2030 that is to be newly transmitted includes Previous Block ACK Request (PBAR) information. The PBAR information includes information re-requesting a Block ACK corresponding to the previously transmitted data frames 2010.

After receiving the PBAR information, the receiving end 2002 transmits a Block ACK 2040 including Block ACK information (hereinafter referred to as "PBA information") respective data frames 2010, which were previously received, in accordance with the PBAR information. After receiving the Block ACK 2030 including the PBA information, the transmitting end 2001 may re-transmit the previous data frames 2010 that have failed to be transmitted in accordance with the Block ACK information. By performing the above-described procedure, the unconditional re-transmission of the data frames may be prevented.

Figure 21:
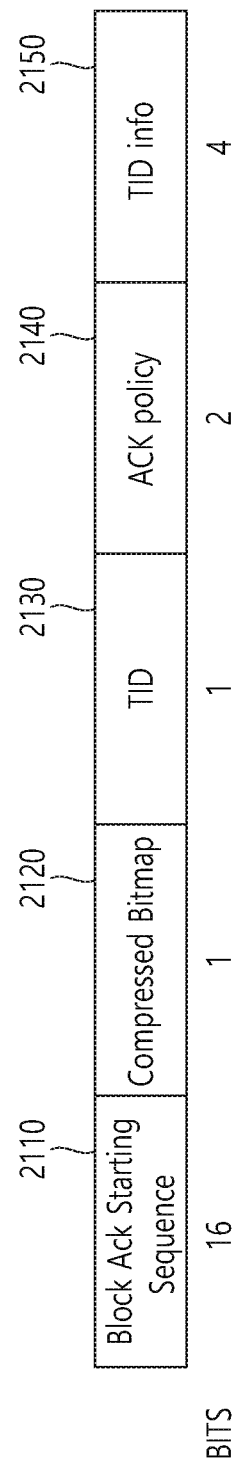
FIG. 21 illustrates an example of PBAR information.

FIG. 21 illustrates an example of PBAR information.

In case the PBAR information is implemented in a bit block format, the PBAR information may be implemented in the format shown in FIG. 21.

A Block ACK Starting Sequence field 2110 may indicate a sequence number of a data frame, which was most initially transmitted among the data frames requesting for the Block ACK.

A Compressed Bitmap field 2120 indicates whether or not a compressed bitmap has been used.

A TID field 2130 is used when only the Block ACK corresponding to a specific TID 15 requested. For example, when the field value is equal to 1, a TID info field 2150 indicates a specific TID.

An ACK policy field 2140 represents an ACK policy corresponding to the PBA information. For example, the field may indicate at least one of an Immediate Block ACK, a Delayed Block ACK, and No ACK.

Figure 22:
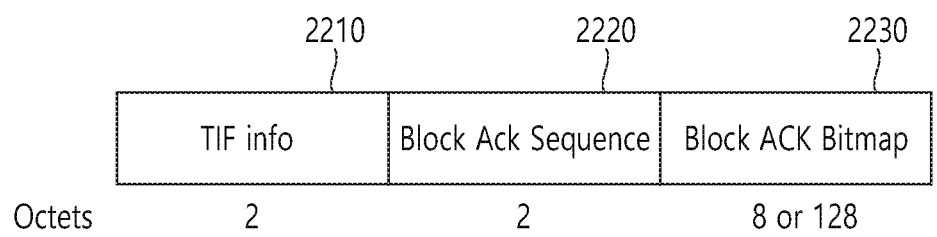
FIG. 22 illustrates an example of PBA information.

FIG. 22 illustrates an example of PBA information.

A TID info field 2210 exists only when TID information is being required, and this field indicates TID information of the corresponding Block ACK.

A Block ACK Sequence field 2220 indicates to which Block ACK corresponding to which Data frame the Block ACK Bitmap corresponds.

A Block ACK Bitmap field 2230 corresponds to 8 bytes, in case it is a Compressed Bitmap, and, otherwise, the field corresponds to 128 bytes. In case this field is omitted, it may be understood (or considered) that all of the subframes have been successfully transmitted.

Figure 23:
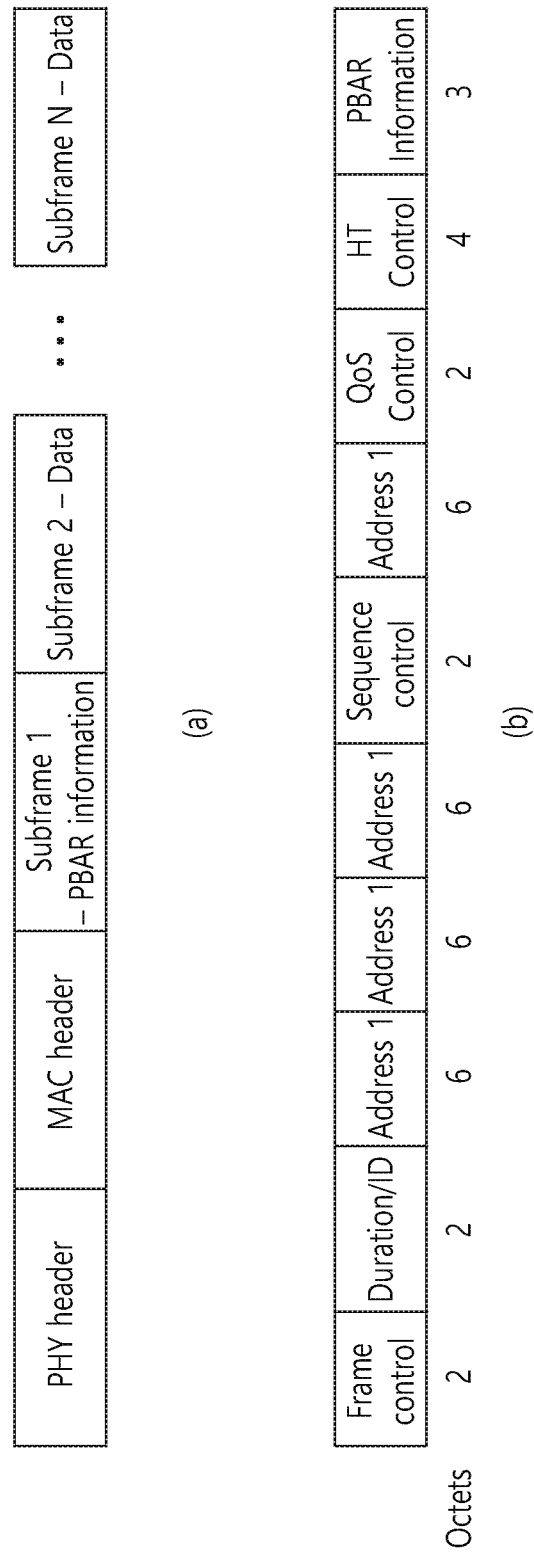
FIG. 23 illustrates a structure wherein the PBAR information is included in the A-MPDU or MAC header.

FIG. 23 illustrates a structure wherein the PBAR information is included in the A-MPDU or MAC header.

Sub-drawing (a) of FIG. 23 relates to an example, wherein the PBAR information is included in the A-MPDU. More specifically, as shown in the drawing, the PBAR may be transmitted to one of the subframes of the A-MPDU.

More specifically, the PBAR information may be configured of one specific subframe. In this case, the MAC header may indicate information corresponding to a subframe including the PBAR information. The example of FIG. 23 corresponds to an example, wherein the PBAR information is included in the first subframe.

Sub-drawing (b) of FIG. 23 relates to an example, wherein the PBAR information is included in the MAC header. As shown in the drawing, the PBAR information may be added after the HT Control field. A DATA+PBAR information frame may be newly defined in the Frame type field, and the Frame control field may indicate that the corresponding frame corresponds to the DATA+PBAR information frame. By doing so, the receiver may know in advance that the PBAR information has been added after the MAC Header, and, then, the receiver may perform decoding of the corresponding PBAR information.

Figure 24:
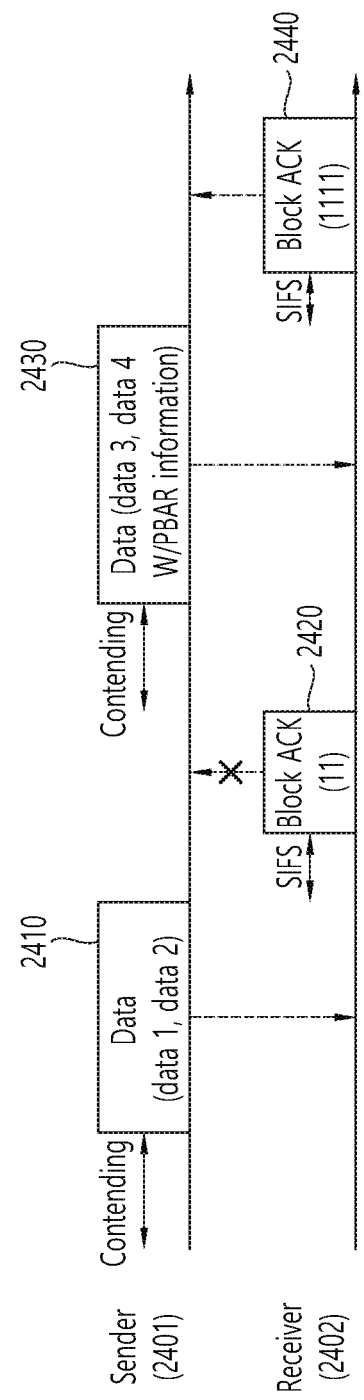
FIG. 24 illustrates an example of re-transmitting data by using the PBAR information.

FIG. 24 illustrates an example of re-transmitting data by using the PBAR information.

The transmitting end 2401 transmitted a Data frame 2410, which includes Data1 and Data2, and the receiving end successfully receives all of the transmitted data. In this case, the receiving end 2402 may configure the BA 2420 in a bitmap format, and an example of the bitmap may be equal to "11". "11" may signify a successful reception. If the BA 2420 fails to be received by the transmitting end 2401, the transmitting end 2401 determines that an error has occurred in the BA 2420 and omits the process of re-transmitting the previous Data frame 2410. Instead, the transmitting end 2401 configures a new data frame 2430, which is successive to the previous Data frame, and which includes Data3 and Data4. it is preferable that PBAR information corresponding to the previous Data frame 2410 is included in the new Data frame 2430. The receiving end 2402 that has received the new data frame 2430 transmits a Block ACK and configures a bitmap with "1111" including even the Block ACK information corresponding to the previous Data frame 2410, and, then, the receiving end 2402 transmits the configured bitmap through a new BA 2440. More specifically, the receiving end 2402 may transmit a BA 2440 corresponding to all of Data 1, 2, 3, and 4.

In case the transmitting end fails to successfully receive the BA, it is important to decide (or determine) in which of the Data frame and the BA the error has occurred. In most cases, since the BA is more robust than the Data frame, cases when an error occurs only in the BA due to a wireless channel are rare. More specifically, in case an error corresponding to the BA has occurred, a collision may occur due to a hidden terminal.

Figure 25:
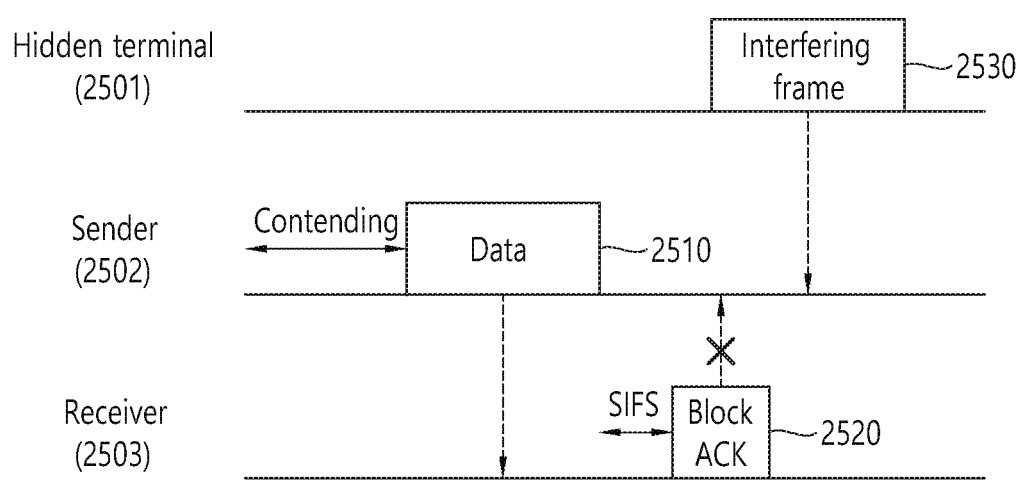
FIG. 25 illustrates a collision caused by a hidden terminal.

FIG. 25 illustrates a collision caused by a hidden terminal.

As shown in the drawing, after the transmitting end 2502 has transmitted the Data frame 2510, a hidden terminal 2501 may determine that a wireless medium is idle. In this case, by transmitting another Frame 2530 while the Block ACK 2520 is being transmitted, an error corresponding to the BA may occur.

Although the transmitting end 2502 has successfully received the Preamble of the PPDU of the BA, in a situation where a MAC payload has failed to be received, if the wireless medium is continuously busy even after the L-SIG field, the corresponding transmitting end may verify that an error has occurred in the BA. Alternatively, even if the reception of the Preamble has failed, even in a case when a specific signal has been received after a SIFS since the transmission of the Data frame 2510 and when the medium is busy for more than a predetermined period of time, the corresponding transmitting end may verify that a collision corresponding to the BA has occurred. This is because the transmitting end knows the general length of the BA.

As described above, even if it is not caused by a hidden terminal 2501, an error may occur even in a case when a MCS being applied with respect to the BA has been incorrectly selected. Moreover, an error may also occur due to a wireless channel. More specifically, the example of this specification may also be applied in a case when the Preamble of the BA has been successfully received while the reception of the MAC payload has failed.

In case the BA is being transmitted through a Preamble of the 802.11 ac/ax standard (or specification), the transmitting end may determine whether or not the BA corresponds to the BA that is to be received by the transmitting end by using BSS color information (i.e., identification information identifying a BSS), which is acquired during a Preamble decoding procedure. For example, if a PPDU frame that is received by the transmitting end after transmitting the Data frame (e.g., UL Data frame) corresponds to a PPDU frame indicating BBS color information corresponding to the transmitting end, even if the transmitting end has failed to successfully decode the data payload, the transmitting end may determine that the receiving end has successfully received the BA. Alternatively, however, if the received PPDU frame indicates another BBS Color information, the data frame may be re-transmitted by performing a general re-transmission operation.

FIG. 26 illustrates an example of a BAR frame being transmitted in case an error occurs with respect to the BA.

Even if the transmitting end 2601 determines that can error has occurred in the BA 2620 due to a collision, there may not exist any further data frames that are to be transmitted later on. In this case, the BA may be requested once again (or re-requested) through a Block ACK request (BAR) frame 2630. In the example of FIG. 26, even in a case when data frames that are to be transmitted exist, a BAR frame 2630 may be transmitted instead of the data frame in accordance with the decision (or judgement) made by the transmitting end 2601.

The above-described concepts may be used for a Multi User transmission (MU transmission). The MU transmission may be carried out by using diverse methods. For example, the MU transmission may be realized by using a method of allocating RUs to multiple users according to the method described in FIG. 4 to FIG. 6. More specifically, one Data field may be allocated in multiple RU units, and the allocation information may be delivered to the SIG-B, which includes a user-shared field and a user-specific field, as described above in FIG. 8. More specifically, it is preferable that the OFDMA transmission is performed in RU units. Meanwhile, the MU-MIMO method according to which multiple users are allocated may be applied to a specific RU (e.g., 106-RU and RU larger than 106-RU). More specifically, it may be possible to allocate multiple users through a spatial multiplexing method to RUs corresponding to the same time-frequency resource.

Figure 27:
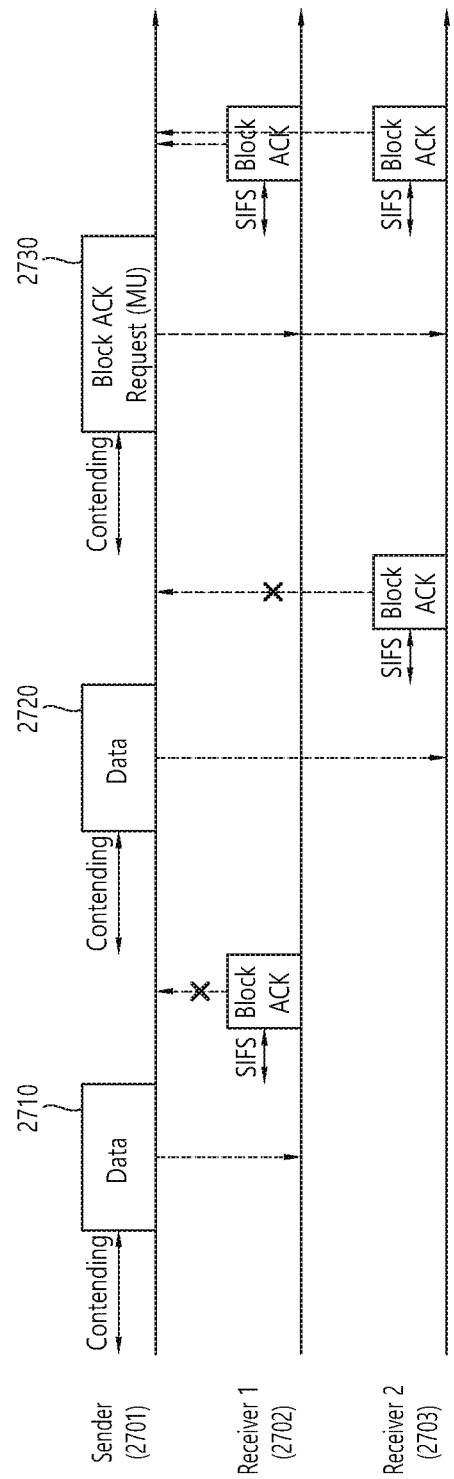
FIG. 27 illustrates an example of a BAR being transmitted through a MU transmission.

FIG. 27 illustrates an example of a BAR being transmitted through a MU transmission.

As shown in the drawing, the transmitting end 2701 may transmit the BAR 2730 to two receiving ends 2702 and 2703. The transmitting end 2701 of FIG. 27 may correspond to an AP. If the AP sequentially transmits Data frames 2710 and 2720 to the two receiving ends 2702 and 2703, and in case the AP fails to receive the BA corresponding to each of the receiving ends, the BAR frame may be simultaneously transmitted to the two receiving ends 2702 and 2703 via MU transmission.

The following example corresponds to an example of using the above-described PBAR information and PBA information during a MU transmission procedure.

Figure 28:
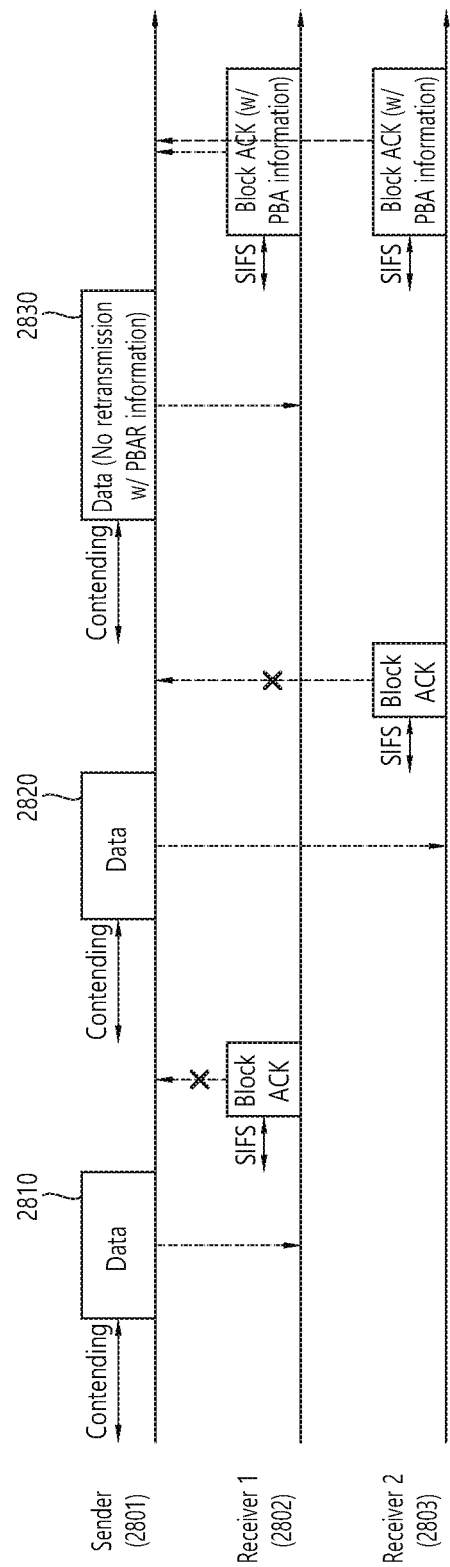
FIG. 28 illustrates an example of the PABR information being included in the MU data.

FIG. 28 illustrates an example of the PABR information being included in the MU data. For example, the transmitting end 2801 of FIG. 28 may correspond to an AP. The AP may sequentially transmit Data frames 2810 and 2820 to two receiving ends 2802 and 2803. And, in case the AP fails to receive respective BAs, while transmitting the MU Data (e.g., the MU-PPDU shown in FIG. 3), instead of performing re-transmission, the AP may transmit only the PBAR information 2830.

Figure 29:
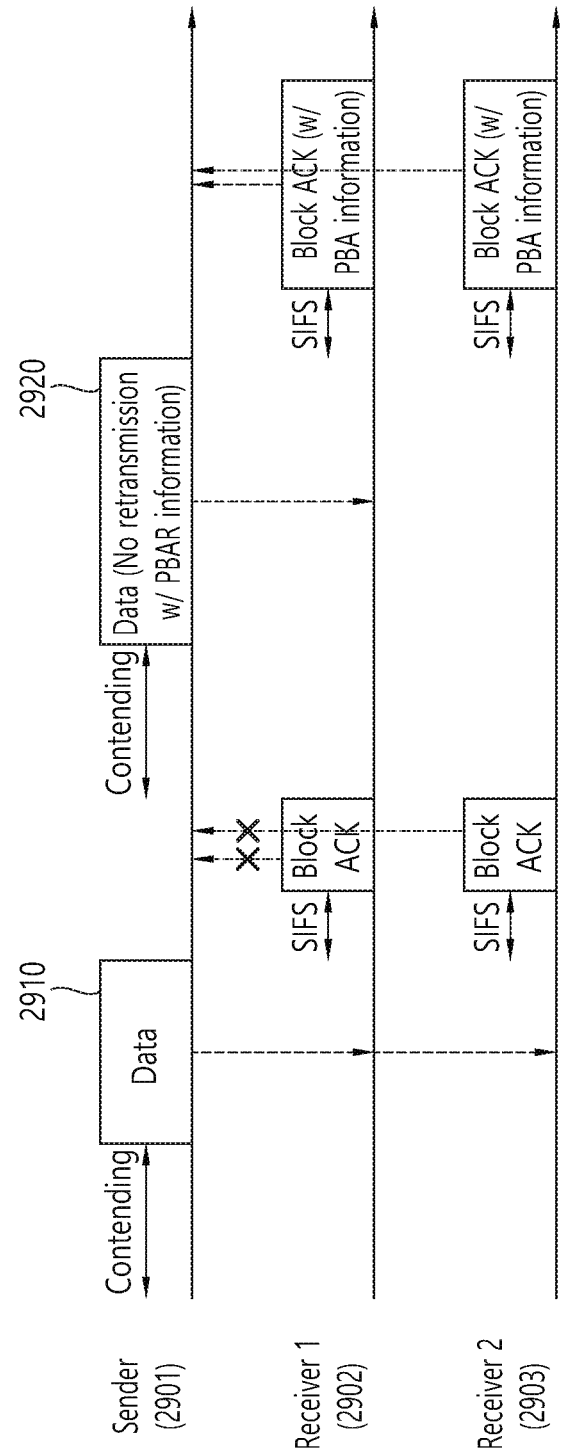
FIG. 29 illustrates an additional example of the PABR information being included in the MU data.

FIG. 29 illustrates an additional example of the PABR information being included in the MU data.

In the example shown in FIG. 29, the transmitting end 2901 may correspond to an AP. The AP may simultaneously transmit a Data frame 2910 to two receiving ends 2902 and

2903. And, in case the AP fails to receive respective BAs, while transmitting the MU Data (e.g., the MU-PPDU shown in FIG. 3), instead of performing re-transmission, the AP may transmit only the PBAR information 2920.

Figure 30:
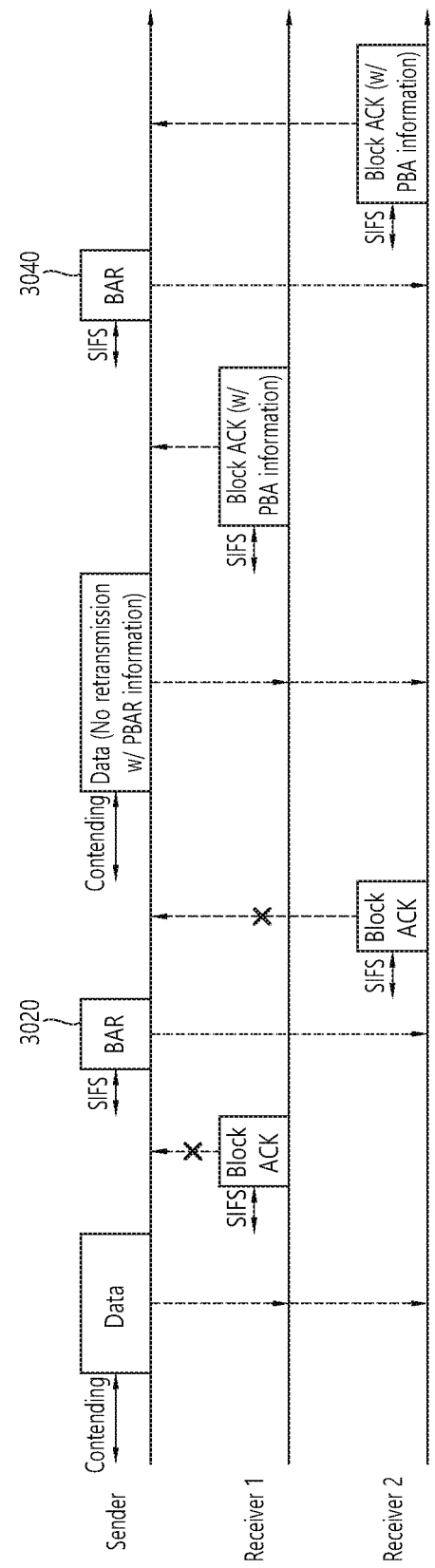
FIG. 30 illustrates an additional example of the PABR information being included in the MU data.

FIG. 30 illustrates an additional example of the PABR information being included in the MU data.

Most of the characteristics shown in FIG. 30 are the same as FIG. 28. However, the difference between FIG. 30 and FIG. 28 is in the operation of performing polling on the BA by using BAR frames 3020 and 3040.

Although the above-described examples may be applied to both DL data and UL data, this example has the highest likelihood of being applied to the procedure of transmitting a BA corresponding to DL data. Hereinafter, an additional example for transmitting UL data will be proposed.

Figure 31:
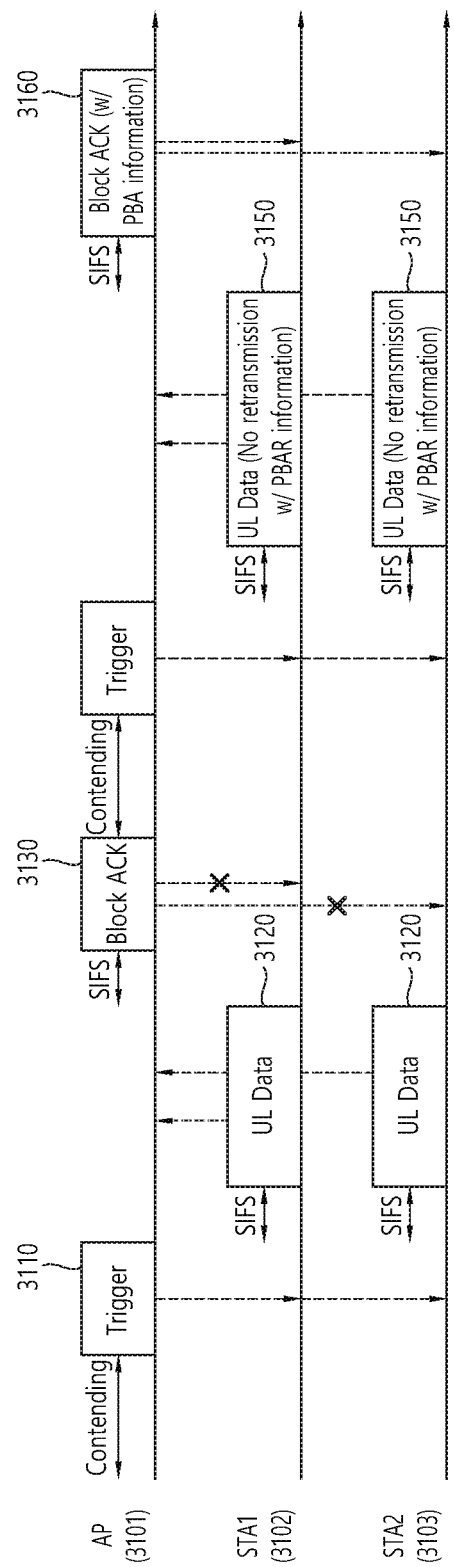
FIG. 31 illustrates a Block ACK transmission procedure for UL Data.

FIG. 31 illustrates a Block ACK transmission procedure for UL Data.

As shown in the drawing, when the AP 3101 sends a Trigger frame 3110, the STAs 3102 and 3103 may transmit UL MU Data 3120. For example, the Trigger frame 3110 of FIG. 31 may be embodied as shown in FIG. 9 to FIG. 11, and the UL MU Data 3120 may be embodied as shown in FIG. 12.

After the STAs 3102 and 3103 have transmitted the UL MU Data 3120, the AP 3101 transmits the BA 3130. In this case, if an error occurs in the BA 3130, when transmitting the next UL MU Data 3150, the STAs 3102 and 3103 may include the PBAR information. The STAs 3102 and 3103 may estimate a time point at which the BA 3130 corresponding to the UL MU Data 3120 is to be received. And, therefore, if the BA is not received, the STAs 3102 and 3103 may verify that an error has occurred during the reception procedure of the BA. When the AP 3101 receives the UL data 3150 including the PBAR information, the AP 3101 may include the PBA information in the BA 3160 when transmitting the BA 3160.

Figure 32:
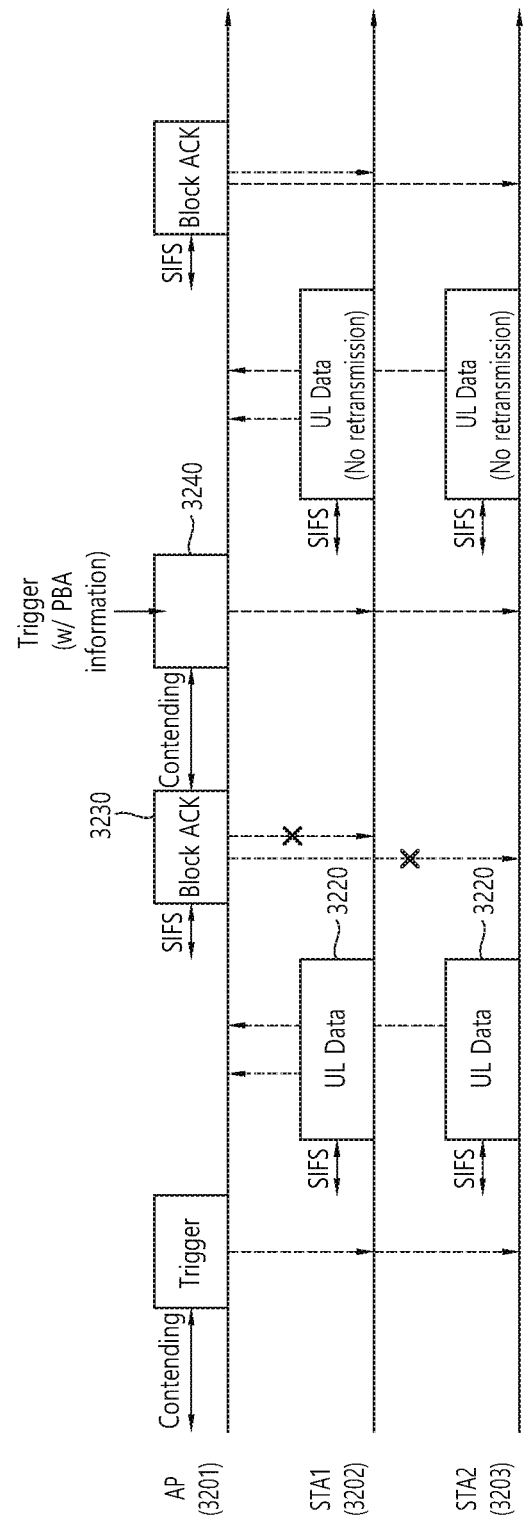
FIG. 32 illustrates an example of the trigger frame including the PBA information.

FIG. 32 illustrates an example of the trigger frame including the PBA information.

As shown in the drawing, in case the AP 3201 transmits the Trigger frame 3240, the AP 3201 may include ACK information corresponding to the UL MU Data 3220 that were previously transmitted. More specifically, PBA information corresponding to the UL MU Data 3220 may be included in the Trigger frame 3240. More specifically, in case of the STAs 3202 and 3203, the ACK/BA information 3230 and 3240 may be consecutively received twice. Through this procedure, the problems caused by the case when an error occurs in the ACK/BA may be reduced. If the AP 3201 is capable of determining that an error frequently occurs in the ACK/BA that is (or are) transmitted to a specific MU group, the example of FIG. 32 may be effectively used. Other characteristics of FIG. 32 may be the same as the example of FIG. 31.

Figure 33:
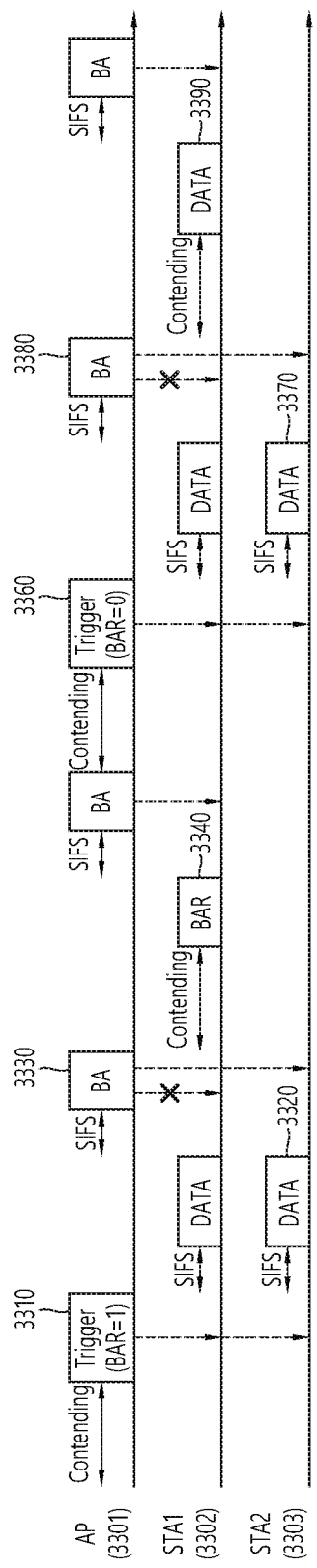
FIG. 33 illustrates an example of the trigger frame including the BAR.

FIG. 33 illustrates an example of the trigger frame including the BAR.

As shown in the drawing, a BAR may be included in the Trigger frames 3310 and 3360, which are transmitted by the AP 3301. More specifically, in case the STAs 3302 and 3303 fail to successfully receive the BAs 3330 and 3380 corresponding to the uplink data 3320 and 3370, information related to whether or not the corresponding STAs 3302 and 3303 are to transmit the BAR and information related to whether or not the data are to be re-transmitted are indicated in the Trigger frame 3310 and 3360 by the BAR. Generally, since the AP 3301 establishes an association with multiple STAs, the memory may not be sufficient enough to store the BAs that were transmitted for each of the STAs 3302 and 3303. Therefore, when transmitting the Trigger frames 3310 and 3360, depending upon the current memory status, the AP 3301 may decide whether or not to store the BA information and may set up the BAR (e.g., the BAR may be configured in BAR transmission bits) as 1 or 0, and may then notify the user equipment. After receiving such notification, when the STA fails to receive the BA, the STA determines whether or not to transmit the BAR 3340 or whether or not to re-transmit the Data 3390 in accordance with the BAR (i.e., the BAR transmission bits) of the Trigger frames 3310 and 3360. Other characteristics of FIG. 33 may be the same as the example(s) shown in FIG. 31 and/or FIG. 32.

Figure 34:
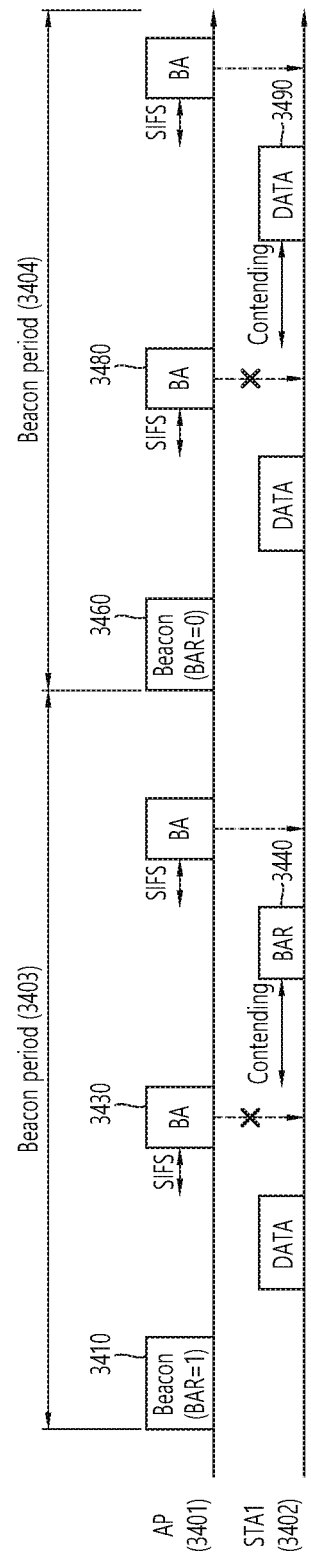
FIG. 34 illustrates an example of a beacon frame including the BAR.

FIG. 34 illustrates an example of a beacon frame including the BAR.

More specifically, when the STA 3402 has failed to receive the BA during the corresponding beacon periods 3403 and 3404, the BAR that is indicated in the beacon frame may indicate whether the BAR 3440 is to be transmitted or whether the Data 3490 are to be re-transmitted. The STA 3402 may verify from the Beacon frames 3410 and 3460 whether or not the BAR transmission during the corresponding beacon periods 3410 and 3460 has been carried out. Thereafter, after failing to receive the BAs 3430 and 3480, the STA 3402 may decide whether to transmit the BAR 3440 or whether to re-transmit the Data 3490.

Figure 35:
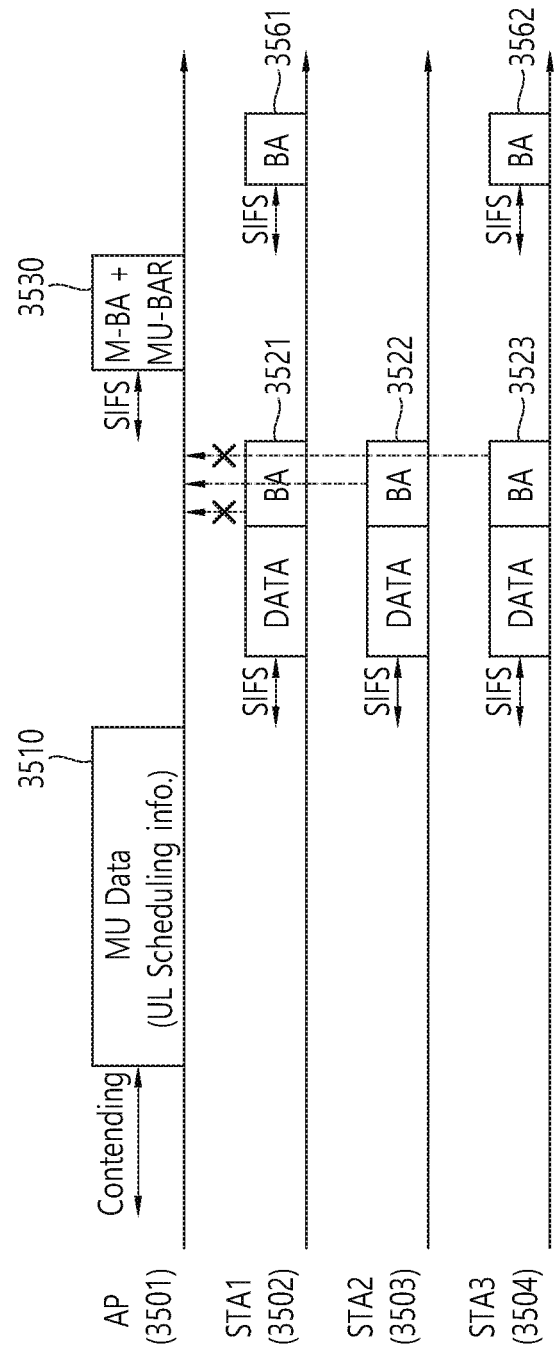
FIG. 35 illustrates an enhanced example of an ACK transmitting method corresponding to MU Data.

FIG. 35 illustrates an enhanced example of an ACK transmitting method corresponding to MU Data.

As shown in the drawing, the AP 3501 may transmit a downlink MU PPDU 3510 for multiple receiving stations 3502, 3503, and 3504. In this case, the ACK policy may be predetermined as an immediate ACK. After the downlink MU PPDU 3510 has been transmitted, in case an ACK frame corresponding to the downlink MU PPDU 3510 fails to be received after a SIFS, the AP 3501 may transmit a MU-BAR 3530 corresponding to the downlink MU PPDU 3510. In this case, the MU-BAR 3530 may become the trigger frame, which is shown in FIG. 9 to FIG. 11.

The example of FIG. 35 relates to a case when immediate ACKs 3521 and 3523 are not received from some of the stations 3502 and 3504. Accordingly, the MU-BAR 3530 may request for a transmission of BAs corresponding to the corresponding stations 3502 and 3504. For example, the MU-BAR 3530 may include identification information corresponding to the stations 3502 and 3504 that have been requested to transmit the BAs 3561 and 3563, and the MU-BAR 3530 may indicate the frequency resources that are used for the transmission of the BAs 3561 and 3563. For example, the frequency resources that are used for the transmission of the BAs 3561 and 3563 may be indicated in the RU units shown in FIG. 4 to FIG. 6.

In the example of FIG. 35, it is preferable that the MU PPDU 3510 is transmitted by the above-described MU transmission. More specifically, the data field that is included in the MU PPDU 3510 may be allocated in multiple RU units, and the allocation information may be delivered to the SIG-B, which includes a user-shared field and a user-specific field, as described above in FIG. 8. More specifically, it is preferable that the OFDMA transmission is performed in RU units. Meanwhile, the MU-MIMO method according to which multiple users are allocated may be applied to a specific RU (e.g., 106-RU and RU larger than 106-RU). More specifically, it may be possible to allocate multiple users through a spatial multiplexing method to RUs corresponding to the same time-frequency resource. Additionally, the MU PPDU 3510 may be realized as the example of FIG. 3.

Additionally, as shown in the drawing, the example of FIG. 35 may be used in a cascade structure. In a cascade structure, downlink MU-PPDUs (e.g., these may be realized in the format shown in FIG. 3) and uplink PPDUs (e.g., these may be realized in the format shown in FIG. 12) may be consecutively exchanged during the same TXOP. In this case, as shown in the example of FIG. 35, data exchange between one AP and multiple STAs is possible.

More specifically, after the AP 3501 transmits the DL MU data 3510, the AP 3501 receives the UL Data and the BAs 3521, 3522, and 3523. However, the AP 3501 fails to receive some of the UL BAs 3521 and 3523, and, accordingly, the AP 3501 requests a BA re-transmission to the STAs 3502 and 3504 through the BAR 3530. And, at this point, the AP 3501 may transmit the request by also including the BAs 3561 and 3563 corresponding to the UL Data.

Figure 36:
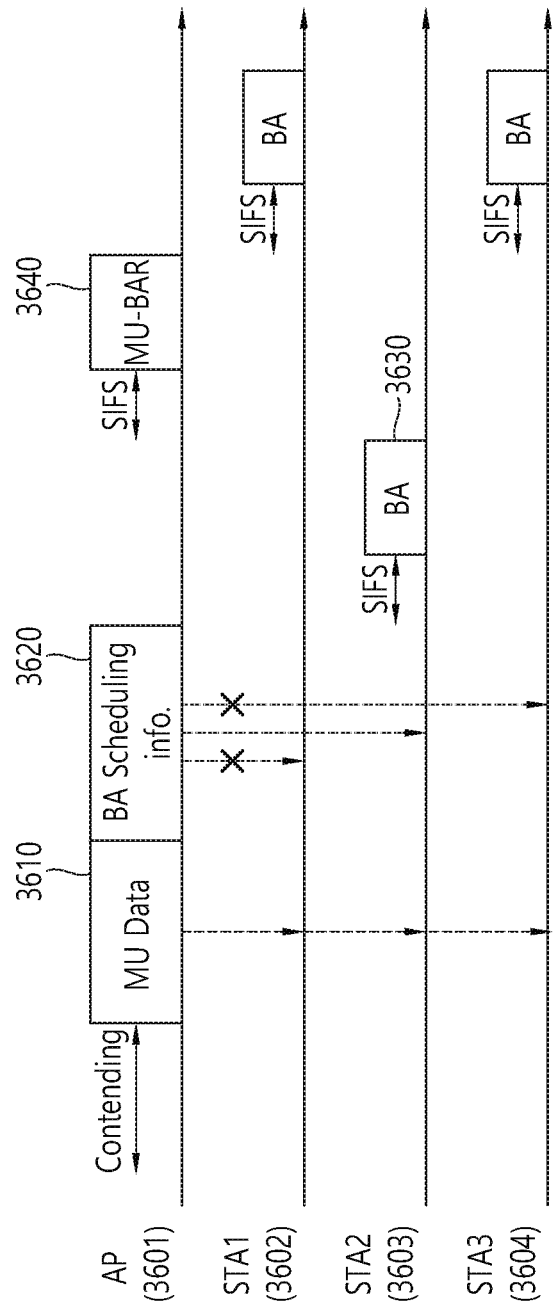
FIG. 36 illustrates an example of downlink data being transmitted along with scheduling information for the BA.

FIG. 36 illustrates an example of downlink data being transmitted along with scheduling information for the BA. The example of FIG. 36 may be combined with the above-described example (e.g., the example of FIG. 35).

As shown in the drawing, the downlink MU Data 3610 may additionally include BA scheduling information. The BA scheduling information may indicate information for the uplink BA 3630. More specifically, although some of the STAs 3602 and 3604 have successfully received the DL MU Data 3610, if the corresponding STAs 3602 and 3604 fails to receive the scheduling information 3620 for the UL BA transmission, the corresponding STAs 3602 and 3604 cannot transmit the BA 3630. In this case, since the AP 3601 cannot receive the BA 3630, generally, the data are re-transmitted. However, according to the example of FIG. 36, the overhead may be reduced by transmitting a MU-BAR 3640. As described above, the MU-BAR 3640 may include scheduling information for the BA transmission.

Figure 37:
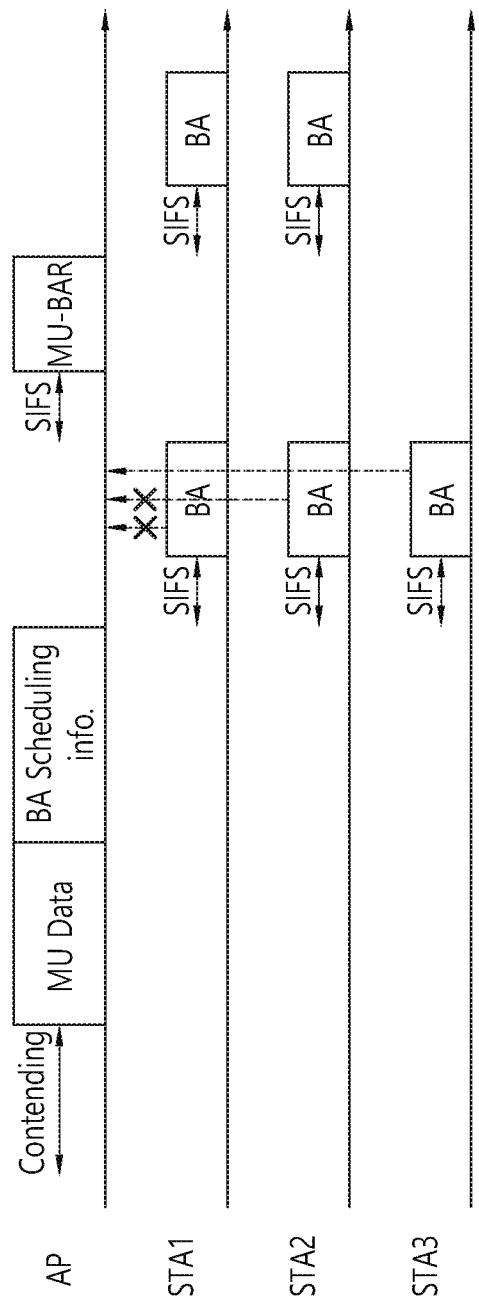
FIG. 37 illustrates an example of an additional modification of the example shown in FIG. 36.

The example of FIG. 37 corresponds to an additionally modified version of the example shown in FIG. 36. As shown in the drawing, even if the STA successfully receives the scheduling information, the BA that is transmitted the AP may not be successfully delivered. In this case, as shown in the example of FIG. 36, the MU-BAR may be transmitted.

When applying the example to this specification, the following useful operations may be added to the transmitting end and the receiving end.

Transmitting end: When transmitting the Data frame, even if the immediate ACK/BA is set up as the ACK policy, it will be preferable to store the information on the transmitted Data frame for a predetermined period of time. By storing information related to the PBAR information, such as Sequence, ACK policy, TID, and so on, the transmitting end may prepare for the situation when an error occurs in the ACK/BA.

Receiving end: Even if the receiving end has transmitted the ACK/BA after receiving a Data frame having the immediate ACK/BA set up as the ACK policy, it will be preferable to store the information on the Data frame for a predetermined period of time. In case of receiving the PBAR information later on, after adequately acquiring PBA information from the stored Data frame, the receiving end may include the acquired PBA information to the ACK/BA frame and may, then, transmit the ACK/BA frame.

Additionally, it will be preferable to add the following technical characteristics or Protocols between the STA and the AP.

AP: It will be preferable for the AP to notify the STA of the time period during which the information on the Data frame that is received by the AP is to be stored in the Beacon frame or Probe response frame, Association response frame, or a specific Management frame. In order to indicate the storage time to the STA, a new field may be added to the Capability field so as to express (or indicate) the storage time in a predetermined time unit (e.g., msec). For example, signaling that indicates the STA to store all of the received Data frames may be delivered to the STA. Through this process, the STA may decide whether to apply the example according to this exemplary embodiment (i.e., the method omitting re-transmission) or whether to use the related art re-transmission method.

STA: The STA notifies the AP of the time period during which the STA stores, in the Probe request frame or Association request frame, or the specific Management frame, the information on the Data frame that it has received. The detailed signaling method may be the same as the signaling method carried out in the AP.

In order to apply the example of this specification, it will be preferable for the STA or AP to store the corresponding ACK/BA information during a predetermined period of time even after the STA or AP, which has received the data, has transmitted the ACK/BA. This is because, in case an error occurs in the corresponding ACK/BA, the STA/AP that has transmitted the data may re-request the ACK/BA through the PABR.

However, since there is no specific signaling method corresponding to the storage period (or duration) in the current IEEE standard (or specification), the related information may already be deleted by the STA or AP. Most particularly, since the STA is required to consider the memory capacity or power consumption, it cannot immediately delete the ACK/BA information. And, therefore, it will be preferable for the time information for storing the ACK/BA information to be signaled in detailed in accordance with the following example.

In order to signal such time information, it will be preferable for a new field to be defined. Hereinafter, the field that is newly proposed in this specification will be described in detail.

Figure 38:
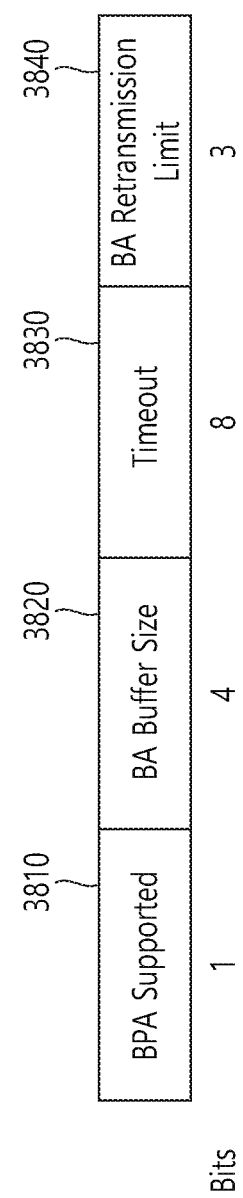
FIG. 38 illustrates an example of field for signaling time information when storing information associated with ACK/BA.

FIG. 38 illustrates an example of field for signaling time information when storing information associated with ACK/BA.

The field that is shown in FIG. 38 may be referred to as a PBAR information field. When the STA transmits an ADDBA request/response frame, the PBAR information field of FIG. 37 may be added thereto and may then be transmitted. Each of the elements shown in the drawing may be omitted depending upon the situation, and the lengths of each element may also vary.

Each element of the field shown in FIG. 38 may be defined as described below.

PBA supported 3810: In a specific STA, if PBA transmission and reception can be carried out, and if the function of re-transmitting the ACK/BA, which was previously transmitted, is supported, the value of this field is set to 1, and, if not, the value of this field is set to 0.

BA Buffer Size 3820: This indicates a maximum number capable of storing the transmitted ACK/BA information (e.g., this field may be indicated by using a number of ACK/BA frames or Byte units capable of performing storage).

Timeout 3830: This field indicates a time period for deleting the stored ACK/BA information.

BA retransmission Limit 3840: This field indicates a maximum number of re-transmissions of the ACK/BA. For example, if the value of this field is equal to 3, when a specific ACK/BA that is being stored is re-transmitted 3 times by the PBAR, the related ACK/BA is deleted by a buffer of the STA. More specifically, in case of receiving the PBAR corresponding to the corresponding ACK/BA even afterwards, a message indicating that the reception has been ignored (or disregarded) or deleted may be transmitted.

As described above, in case the STA receives a PBAR corresponding to the ACK/BA, which has already been deleted, the STA may ignore the reception and may not transmit any response after a SIFS. Alternatively, the STA may configure a bitmap indicating that an error has occurred in all of the subframes and may then transmit the ACK/BA.

Additionally, the STA transmitting data may notify whether or not the ACK/BA of the corresponding data is required to be stored along with the data when transmitting the data. By using a reserved bit of the HT Control field, this information may use a method of identifying a case when the corresponding bit is equal to 0 or 1. For example, in case the corresponding bit is equal to 1, the receiving end that has received this bit may store the ACK/BA information even after the transmission of the ACK/BA of the corresponding data, and in case the corresponding bit is equal to 0, the receiving end may immediately delete the ACK/BA information after the transmission of the ACK/BA.

In case of Voice or Video traffic, since delay is extremely important, re-transmission may not be required to be carried out depending upon the traffic situation. Therefore, in this situation, storage of the ACK/BA information of the corresponding data may be required. Conversely, in case of the FTP, since the flawless condition of the data should be satisfied by performing re-transmission, the ACK/BA information may be stored and the effective re-transmission method that is proposed in the present invention may be used.

Figure 39:
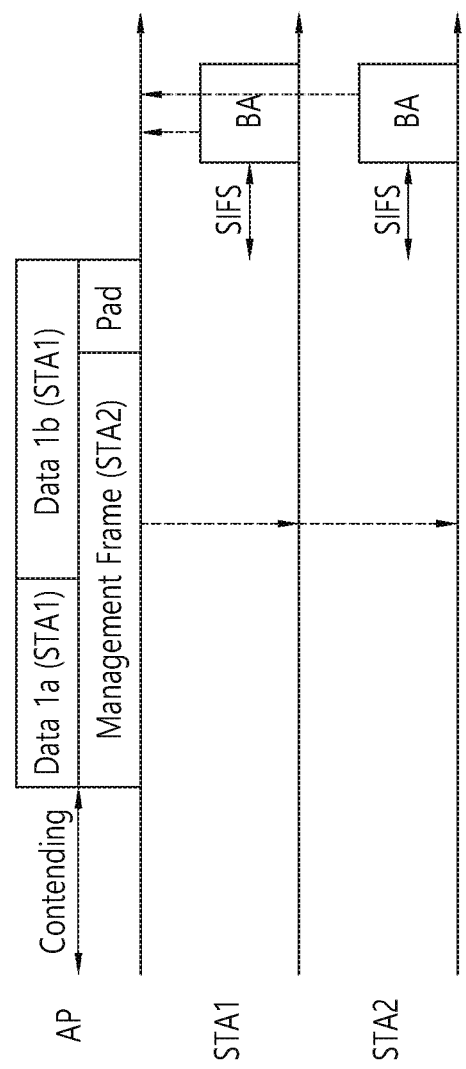
FIG. 39 illustrates an example of the Data frame being transmitted along with a Management frame.

FIG. 39 illustrates an example of the Data frame being transmitted along with a Management frame. As shown in the drawing, Data 1*a*/1*b* for STA1 may be included in a frame that is being transmitted from the AP to STA1 and STA2, and a Management frame for STA2 may also be included in the corresponding frame. After the frame is transmitted from the AP (after a SIFS), the BA corresponding to 2 data frames and an ACK corresponding to one Management frame may be received.

Figure 40:
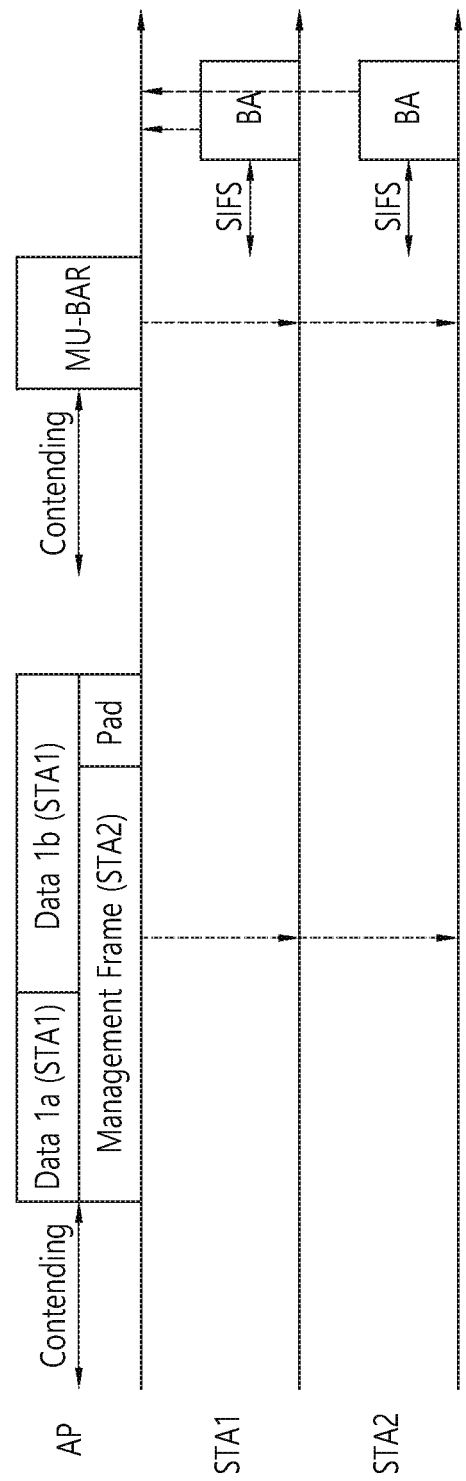
FIG. 40 illustrates an additional example of the Data frame being transmitted along with a Management frame.

FIG. 40 illustrates an additional example of the Data frame being transmitted along with a Management frame. As described above in FIG. 39, Data 1*a*/1*b* for STA1 may be included in a frame that is being transmitted from the AP to STA1 and STA2, and a Management frame for STA2 may also be included in the corresponding frame. In this case, a situation that requires once again a Delay ACK/BA or BA/ACK by using a MU-BAR frame may occur. At this point, the MU-BAR frame may be configured as shown below in the following example.

Figure 41:
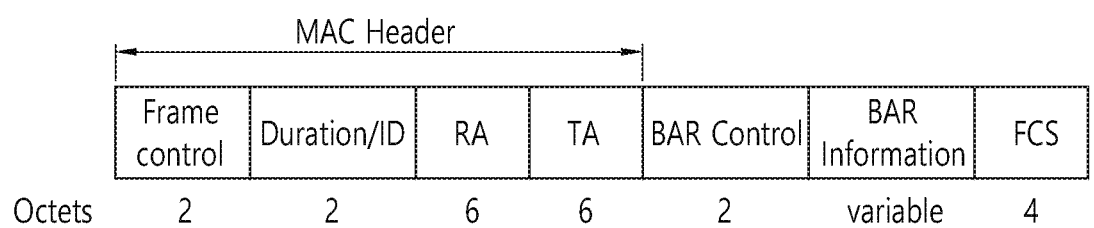
FIG. 41 illustrates an example of a MU-BAR frame.
Figure 41:
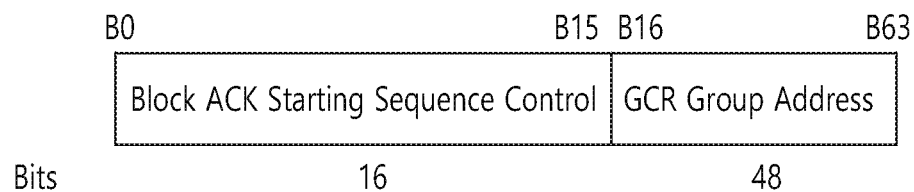

FIG. 41 illustrates an example of a MU-BAR frame. Sub-drawing (a) of FIG. 41 illustrates a BAR frame, and sub-drawing (b) illustrates a BAR information field. More specifically, as a BAR information format, the format of sub-drawing (b) of FIG. 41 may be included in sub-drawing (a) of FIG. 41.

By using the structure of FIG. 41, the AP may specifically indicate to the user equipment to which Data frame the BA that is to be transmitted belongs, while transmitting the BAR frame to the STA. More specifically, by using a Block Ack Starting Sequence Control field, which is indicated in sub-drawing (b) of FIG. 41, among the data frames that were previously transmitted by the AP, the STA may be capable of knowing to which data frame the required BA belongs.

However, since a Frame sequence does not exist in the management frame, the Block Ack Starting Sequence Control field of the BAR frame shown in FIG. 41 cannot be used. Therefore, in this specification, a method for indicating a Management frame in order to allow the MU-BAR frame to receive the ACK/BA will hereinafter be proposed as described below as Method 1 to Method 3.

Method 1: This corresponds to a method of using a sequence of the data frame, which was transmitted immediately before the transmission of the Management frame.

For example, it may be assumed that the STA has consecutively received Data1 (sequence: 111), Data2 (sequence: 112), Management frame, and Data3 (sequence: 113) from the AP. At this point, when the AP requests for the ACK/BA corresponding to the management frame, the sequence is set to 112 and then transmitted. The user equipment that has received this sequence transmits the ACK/BA corresponding to the management frame to the AP.

A 1 bit indication for notifying that the current BAR requests for the ACK/BA corresponding to the Management frame may be added to the MU-BAR.

Method 2: This corresponds to a method of allocating a specific Sequence to the Management frame.

For example, a specific Sequence (e.g., 0xffff) is allocated and used as the sequence of the management frame. The STA that has received this specific Sequence may transmit the ACK/BA corresponding to the most recently received management frame.

In order to request the ACK/BA corresponding to the management frame that was previously received, multiple Sequences may be allocated and used. For example, if 0xfffa to 0xffff are allocated as the sequences of the management frame, 0xffff corresponds to the management frame that was received immediately before the current management frame, 0xfffe corresponds to the management frame that was received immediately before the 0xffff, 0xfffd corresponds to the management frame that was received immediately before the 0xfffe, and so on.

Method 3: This corresponds to a method of using a complement number of the sequence of the data frame that was transmitted immediately before the transmission of the Management frame.

When assuming the example of Method 1, 10001111 (or 10010000) being the complement number of 01110000, which corresponds to 112 being expressed in bits, is used and indicated. The user equipment that has received this verifies whether data received via the corresponding sequence exist (most of the time such data do not exist), and if such data do not exist, the respective complement number is acquired in order to locate (or find) the corresponding data frame, and, then, the ACK/BA corresponding to the management frame that was received immediately after the located data frame is transmitted.

In other words, the example of this specification relates to a method of deciding whether to re-transmit the Data or whether to transmit the BAR depending upon the situation, in a case when the AP fails to receive the ACK/BA. The standard for deciding whether to omit the data re-transmission and to transmit a BAR or whether to re-transmit the Data as in the related art may vary depending upon the above-described example, or the corresponding standard may follow the standard that is described below.

Firstly, in case the AP transmits MU-Data and, while doing so, aggregates the Trigger frame information to the Unicast trigger frame and transmits the processed Unicast trigger, or in case the AP transmits the MU-Data to a HE Control field (MAC Header), yet when the HE Control field is included in only a part of the subframes instead of all of the subframes that are transmitted, the AP may be operated as described below.

The AP may transmit the BAR to an STA that has failed to receive the ACK/BA. This is because the STA is likely to fail to receive the Trigger frame information and also because, even if the STA that has failed to receive the Trigger frame information successfully receives the Data, the corresponding STA cannot transmit the ACK/BA.

Secondly, while the AP transmits the MU-Data, in case the AP transmits the Trigger frame information to the HE Control field and includes the corresponding information in all of the transmitted Subframes, the AP may be operated as described below.

It is preferable that data are re-transmitted to the STA that has failed to receive the ACK/BA. Since it is added to all of the subframes and transmitted, if the STA fails to receive the trigger frame information, the STA is also incapable of receiving the data. Therefore, it will be preferable to re-transmit the Data to the user equipments that have failed to receive the transmitted ACK/BA.

Figure 42:
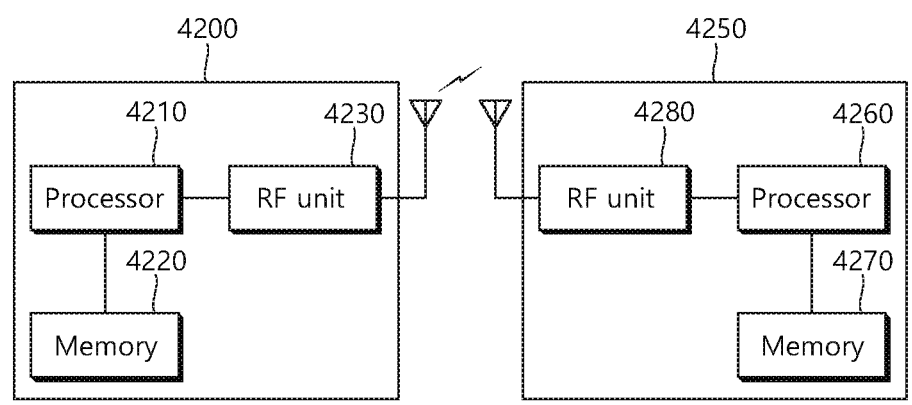
FIG. 42 illustrates a block diagram showing a wireless communication system in which the example of this specification can be applied.

FIG. 42 illustrates a block diagram showing a wireless communication system in which the example of this specification can be applied.

Referring to FIG. 42, as a station (STA) that can realize the above-described exemplary embodiment, the wireless device may correspond to an AP or a non-AP station (non-AP STA). The wireless device may correspond to the above-described user or may correspond to a transmitting device transmitting a signal to the user.

The AP 4200 includes a processor 4210, a memory 4220, and a radio frequency unit (RF unit) 4230.

The RF unit 4230 is connected to the processor 4210, thereby being capable of transmitting and/or receiving radio signals.

The processor 4210 implements the functions, processes, and/or methods proposed in this specification. For example, the processor 4210 may be realized to perform the operations according to the above-described exemplary embodiments of the present invention. More specifically, the processor 4210 may perform the operations that can be performed by the AP, among the operations that are disclosed in the exemplary embodiments of FIG. 1 to FIG. 41.

The non-AP STA 4250 includes a processor 4260, a memory 4270, and a radio frequency unit (RF unit) 4280.

The RF unit 4280 is connected to the processor 4260, thereby being capable of transmitting and/or receiving radio signals.

The processor 4260 may implement the functions, processes, and/or methods proposed in the exemplary embodiment of the present invention. For example, the processor 4260 may be realized to perform the non-AP STA operations according to the above-described exemplary embodiments of the present invention. The processor may perform the operations of the non-AP STA, which are disclosed in the exemplary embodiments of FIG. 1 to FIG. 41.

The processor 4210 and 4260 may include an application-specific integrated circuit (ASIC), another chip set, a logical circuit, a data processing device, and/or a converter converting a baseband signal and a radio signal to and from one another. The memory 4220 and 4270 may include a read-only memory (ROM), a random access memory (RAM), a flash memory, a memory card, a storage medium, and/or another storage device. The RF unit 4230 and 4280 may include one or more antennas transmitting and/or receiving radio signals.

When the exemplary embodiment is implemented as software, the above-described method may be implemented as a module (process, function, and so on) performing the above-described functions. The module may be stored in the memory 4220 and 4270 and may be executed by the processor 4210 and 4260. The memory 4220 and 4270 may be located inside or outside of the processor 4210 and 4260 and may be connected to the processor 4210 and 4260 through a diversity of well-known means.

As described above, the method and apparatus for processing an ACK signal in a wireless local area network system have the following advantages.

This specification proposes an enhanced method and apparatus for processing an ACK signal in a wireless LAN system.

According to an example of this specification, an ACK signal may be efficiently processed by a next generation wireless LAN system configuring a multi-user PPDU through multiple RUs.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of transmitting acknowledgement (ACK) in a wireless LAN system, the method comprising:
   receiving, by a station from an access point (AP), a first physical layer protocol data unit (PPDU) containing data for multiple receiving stations;
   in response to the first PPDU, transmitting, by the station to the AP, a first ACK frame for the first PPDU;
   receiving, by the station from the AP, a second PPDU triggering transmission of multiple ACK frames from multiple non-responding stations which have not transmitted immediate acknowledgement (ACK) frames for the first PPDU; and
   in response to the second PPDU, transmitting, by the station to the AP, a second ACK frame for the first PPDU.

2. The method of claim 1, wherein multiple data fields for the multiple receiving stations are included in different resource units of the first PPDU.

3. The method of claim 2, wherein the first PPDU includes a first signal field and a second signal field,
   wherein the first signal field includes common control information for the multiple receiving stations, and
   wherein the second signal field includes identification information corresponding to the multiple receiving stations and allocation information corresponding to the different resource units.

4. The method of claim 1, wherein the second PPDU includes identification information corresponding to the multiple non-responding stations and frequency resource information for the multiple ACK frames.

5. The method of claim 1, wherein the first PPDU includes a legacy field, a high efficient signal (HE-SIG) field, and a data field, wherein the legacy field includes a legacy short training field (L-STF), a legacy long training field (L-LTF), a legacy signal (L-SIG) field, wherein the HE-SIG field indicates downlink resources for the multiple receiving stations, wherein a first subcarrier spacing is applied to the legacy field and the HE-SIG field and a second subcarrier spacing is applied to the data field, wherein the first subcarrier spacing is four times greater than the second subcarrier spacing.

6. A station in a wireless LAN system, comprising:
a transceiver transmitting or receiving radio signals; and
a processor connected to the transceiver and configured to:
   instruct the transceiver to receive, from an access point (AP), a first physical layer protocol data unit (PPDU) containing data for multiple receiving stations;
   in response to the first PPDU, instruct the transceiver to transmit, to the AP, a first ACK frame for the first PPDU;
   instruct the transceiver to receive, from the AP, a second PPDU triggering transmission of multiple ACK frames from multiple non-responding stations which have not transmitted immediate acknowledgement (ACK) frames for the first PPDU; and
   in response to the second PPDU, instruct the transceiver to transmit, to the AP, a second ACK frame for the first PPDU.

7. The station of claim 6, wherein multiple data fields for the multiple receiving stations are included in different resource units of the first PPDU.

8. The station of claim 7, wherein the first PPDU includes a first signal field and a second signal field,
   wherein the first signal field includes common control information for the multiple receiving stations, and
   wherein the second signal field includes identification information corresponding to the multiple receiving stations and allocation information corresponding to the different resource units.

9. The station of claim 6, wherein the second PPDU includes identification information corresponding to the multiple non-responding stations and frequency resource information for the multiple ACK frames.

10. The station of claim 6, wherein the first PPDU includes a legacy field, a high efficient signal (HE-SIG) field, and a data field, wherein the legacy field includes a legacy short training field (L-STF), a legacy long training field (L-LTF), a legacy signal (L-SIG) field, wherein the HE-SIG field indicates downlink resources for the multiple receiving stations, wherein a first subcarrier spacing is applied to the legacy field and the HE-SIG field and a second subcarrier spacing is applied to the data field, wherein the first subcarrier spacing is four times greater than the second subcarrier spacing.

* * * * *